United States Patent
Yabuki

(10) Patent No.: US 11,138,542 B2
(45) Date of Patent: Oct. 5, 2021

(54) CONFIRMING FIELD TECHNICIAN WORK BASED ON PHOTOGRAPHIC TIME AND LOCATION DEVICE

(71) Applicant: NEC Corporation, Tokyo (JP)

(72) Inventor: Kentarou Yabuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 291 days.

(21) Appl. No.: 16/079,595

(22) PCT Filed: Mar. 3, 2017

(86) PCT No.: PCT/JP2017/008426
§ 371 (c)(1),
(2) Date: Aug. 24, 2018

(87) PCT Pub. No.: WO2017/154758
PCT Pub. Date: Sep. 14, 2017

(65) Prior Publication Data
US 2019/0050765 A1    Feb. 14, 2019

(30) Foreign Application Priority Data
Mar. 9, 2016    (JP) .............................. JP2016-045360

(51) Int. Cl.
*G06Q 10/06*    (2012.01)
*G06Q 10/04*    (2012.01)
(Continued)

(52) U.S. Cl.
CPC ..... *G06Q 10/0635* (2013.01); *G06F 16/9038* (2019.01); *G06Q 10/04* (2013.01);
(Continued)

(58) Field of Classification Search
CPC .... G06Q 10/06; G06Q 10/20; G06Q 10/0631; G06Q 10/06311; G06Q 10/1097; G06Q 10/103; G06Q 10/06398; G06Q 10/063114
See application file for complete search history.

(56) References Cited

U.S. PATENT DOCUMENTS 5,678,046 A * 10/1997 Cahill ................... G06Q 40/02
                                                             707/829
5,821,523 A * 10/1998 Bunte ................ H04N 1/00127
                                                             235/472.01
(Continued)

FOREIGN PATENT DOCUMENTS

JP    2001-202298 A    7/2001
JP    2002-169938 A    6/2002
(Continued)

OTHER PUBLICATIONS

Japanese Office Action for JP Application No. 2018-504437 dated Oct. 15, 2019 with English Translation.
(Continued)

*Primary Examiner* — Scott L Jarrett

(57) ABSTRACT

Provided is an information processing system, and the like, with which even if target information that relates to a target of interest has been disguised, such disguising can be more accurately detected, and the appropriate information intended for presentation to a user can be presented according to the detection results. An information processing system is equipped with: a server apparatus which determines whether or not target information is authentic, on the basis of a determination condition and information from which target information relating to a target of interest has been created and which indicates at least a time/date and a first location and a client which controls a presentation unit such that presentation information intended for presentation
(Continued)

to a user is presented according to the result of the determination made by the server apparatus.

17 Claims, 16 Drawing Sheets

(51) Int. Cl.
  *G06Q 10/00* (2012.01)
  *H04W 4/02* (2018.01)
  *G06F 16/9038* (2019.01)
(52) U.S. Cl.
  CPC ......... *G06Q 10/0631* (2013.01); *G06Q 10/20* (2013.01); *H04W 4/026* (2013.01)

(56) References Cited

U.S. PATENT DOCUMENTS

| | | | | | |
|---|---|---|---|---|---|
| 5,977,913 | A * | 11/1999 | Christ | ............ | G01C 21/206 340/524 |
| 6,021,119 | A * | 2/2000 | Derks | ............ | G06F 15/025 370/261 |
| 6,078,255 | A * | 6/2000 | Dividock | ............ | H04Q 9/00 340/539.1 |
| 7,262,687 | B2 * | 8/2007 | Nelson | ............ | G07C 1/20 340/286.01 |
| 7,313,534 | B2 * | 12/2007 | Scheer | ............ | G06Q 10/06316 705/7.26 |
| 7,831,628 | B1 * | 11/2010 | Silva | ............ | G06Q 30/0283 707/802 |
| 8,059,882 | B2 * | 11/2011 | Amidi | ............ | H04N 1/32101 382/141 |
| 8,359,221 | B2 * | 1/2013 | Gala | ............ | G06Q 10/06398 705/7.16 |
| 8,606,611 | B1 * | 12/2013 | Fedorov | ............ | G06Q 10/103 705/7.13 |
| 8,626,571 | B2 * | 1/2014 | Nielsen | ............ | G06Q 10/06311 705/7.41 |
| 8,694,260 | B1 * | 4/2014 | Jimeno | ............ | G06Q 10/00 702/14 |
| 8,752,144 | B1 * | 6/2014 | Kaufman | ............ | G06F 21/32 726/6 |
| 9,020,848 | B1 * | 4/2015 | Ridge | ............ | G07C 1/10 705/32 |
| 9,082,095 | B2 * | 7/2015 | Duff | ............ | G06Q 10/063114 |
| 10,062,042 | B1 * | 8/2018 | Kelly | ............ | G06Q 10/063116 |
| 10,127,523 | B2 * | 11/2018 | Siegel | ............ | G06Q 10/06311 |
| 10,467,564 | B2 * | 11/2019 | Hull | ............ | H04W 4/029 |
| 2002/0058550 | A1 * | 5/2002 | Pace | ............ | G06Q 10/109 463/42 |
| 2003/0163708 | A1 * | 8/2003 | Tang | ............ | G07C 9/37 713/185 |
| 2004/0267592 | A1 * | 12/2004 | Ogushi | ............ | G06Q 10/105 705/7.42 |
| 2005/0035863 | A1 * | 2/2005 | Nelson | ............ | G07C 1/20 340/573.1 |
| 2005/0182650 | A1 * | 8/2005 | Maddox, Jr. | ............ | G06Q 10/20 705/305 |
| 2007/0100583 | A1 * | 5/2007 | Yano | ............ | G05B 23/0216 702/184 |
| 2007/0129914 | A1 * | 6/2007 | Yano | ............ | G05B 23/0283 702/184 |
| 2008/0177646 | A1 * | 7/2008 | Frink | ............ | G07C 1/10 705/32 |
| 2008/0235040 | A1 * | 9/2008 | Ratliff | ............ | G06Q 10/06 705/1.1 |
| 2009/0204434 | A1 * | 8/2009 | Breazeale, Jr. | ............ | G16H 40/20 705/3 |
| 2009/0207019 | A1 * | 8/2009 | Nielsen | ............ | G06Q 10/063112 340/540 |
| 2011/0035260 | A1 * | 2/2011 | Nielsen | ............ | G06Q 10/06398 705/7.42 |
| 2011/0199478 | A1 | 8/2011 | Ito | | |
| 2012/0123951 | A1 * | 5/2012 | Hyatt | ............ | G06Q 10/10 705/305 |
| 2013/0030875 | A1 * | 1/2013 | Lee | ............ | G06Q 30/0267 705/7.38 |
| 2013/0117078 | A1 * | 5/2013 | Weik, III | ............ | E05F 15/70 705/13 |
| 2014/0108507 | A1 * | 4/2014 | Barker | ............ | H01R 13/5202 709/203 |
| 2014/0278644 | A1 * | 9/2014 | Ferreira | ............ | G06Q 10/063114 705/7.15 |
| 2014/0278645 | A1 * | 9/2014 | Davidson | ............ | G06Q 10/08 705/7.15 |
| 2014/0365256 | A1 * | 12/2014 | Duff | ............ | G06Q 10/063114 705/7.15 |
| 2015/0112647 | A1 * | 4/2015 | Currin | ............ | G06F 30/13 703/1 |
| 2015/0149242 | A1 * | 5/2015 | Nielsen | ............ | G06Q 50/08 705/7.28 |
| 2015/0161553 | A1 * | 6/2015 | Eggleston | ............ | H04W 4/021 705/7.15 |
| 2015/0226584 | A1 * | 8/2015 | Bjornson, Jr. | ............ | G06Q 10/20 702/187 |
| 2015/0269500 | A1 * | 9/2015 | Nielsen | ............ | G06Q 10/063 705/7.11 |
| 2015/0294089 | A1 * | 10/2015 | Nichols | ............ | G06F 3/0304 705/3 |
| 2016/0012361 | A1 * | 1/2016 | Sugiyama | ............ | H04N 21/4147 705/7.38 |
| 2016/0144959 | A1 * | 5/2016 | Meffert | ............ | B64C 39/024 701/3 |
| 2017/0032457 | A1 * | 2/2017 | Dierickx | ............ | G06Q 30/08 |
| 2017/0116669 | A1 * | 4/2017 | Wickstrom | ............ | G06Q 10/1097 |
| 2017/0200108 | A1 * | 7/2017 | Au | ............ | G06Q 10/06398 |
| 2018/0253576 | A1 * | 9/2018 | Talbot | ............ | G06K 7/10881 |
| 2019/0026843 | A1 * | 1/2019 | Kim | ............ | G06F 9/453 |
| 2019/0035070 | A1 * | 1/2019 | Fukuda | ............ | G06K 9/46 |

FOREIGN PATENT DOCUMENTS

| | | | |
|---|---|---|---|
| JP | 2004-126807 A | | 4/2004 |
| JP | 2004-126808 A | | 4/2004 |
| JP | 2004-192424 A | | 7/2004 |
| JP | 2005-197901 A | | 7/2005 |
| JP | 2011248404 | * | 5/2010 ............ G06F 17/60 |
| JP | 2011-170540 A | | 9/2011 |
| JP | 2011-248404 A | | 12/2011 |
| JP | 2012-141831 A | | 7/2012 |
| JP | 2014-174852 A | | 9/2014 |
| JP | 2014-229230 A | | 12/2014 |
| JP | 5750334 B2 | | 7/2015 |
| WO | 2015/113568 A1 | | 8/2015 |

OTHER PUBLICATIONS

International Search Report for PCT Application No. PCT/JP2017/008426, dated May 30, 2017.
English translation of Written opinion for PCT Application No. PCT/JP2017/008426.

* cited by examiner

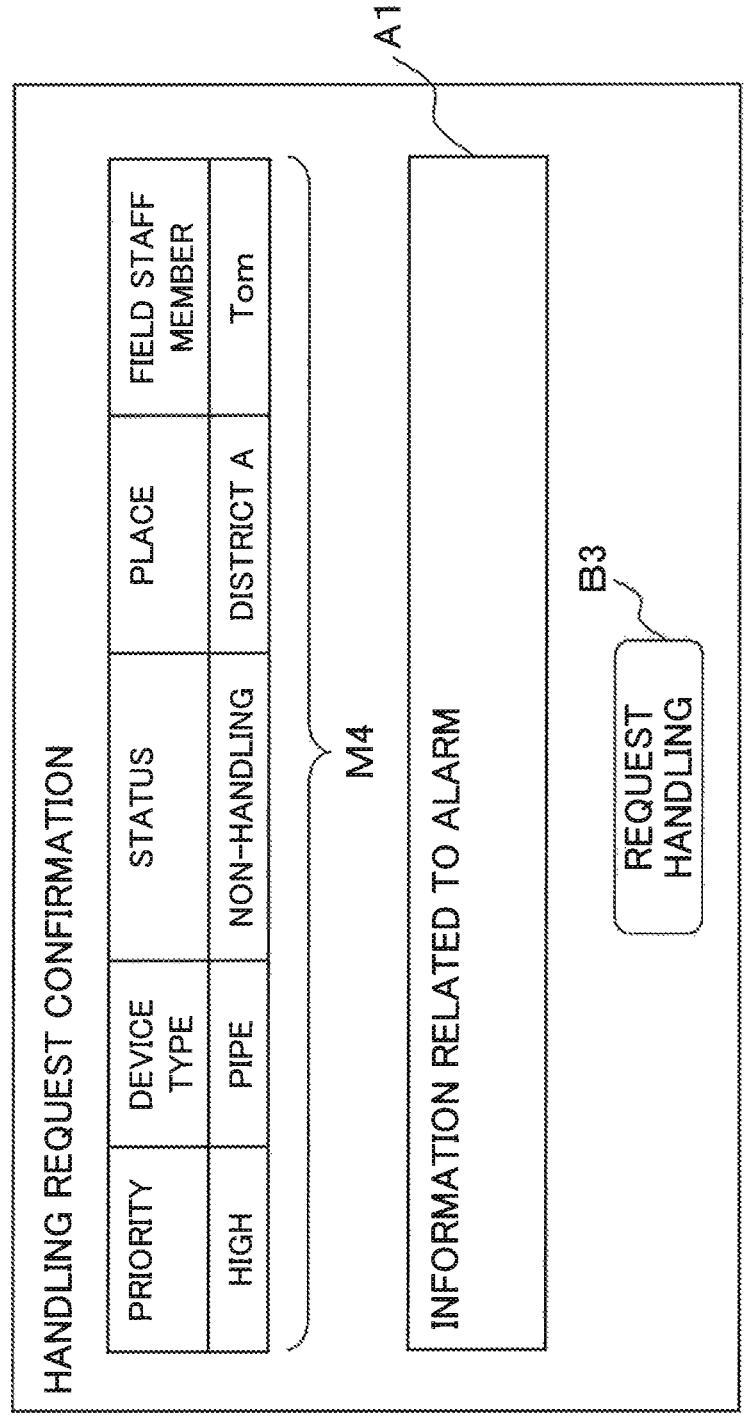

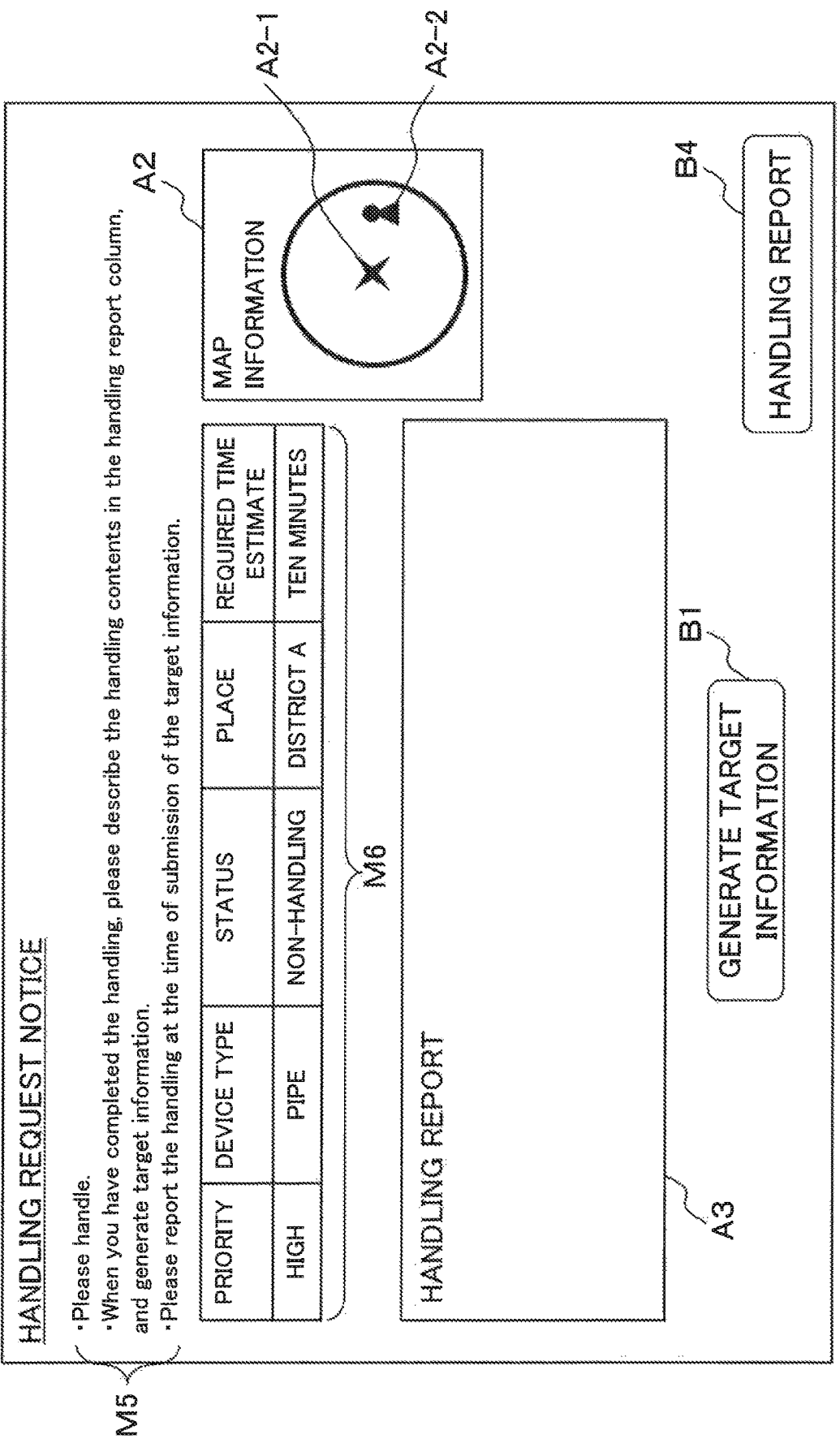

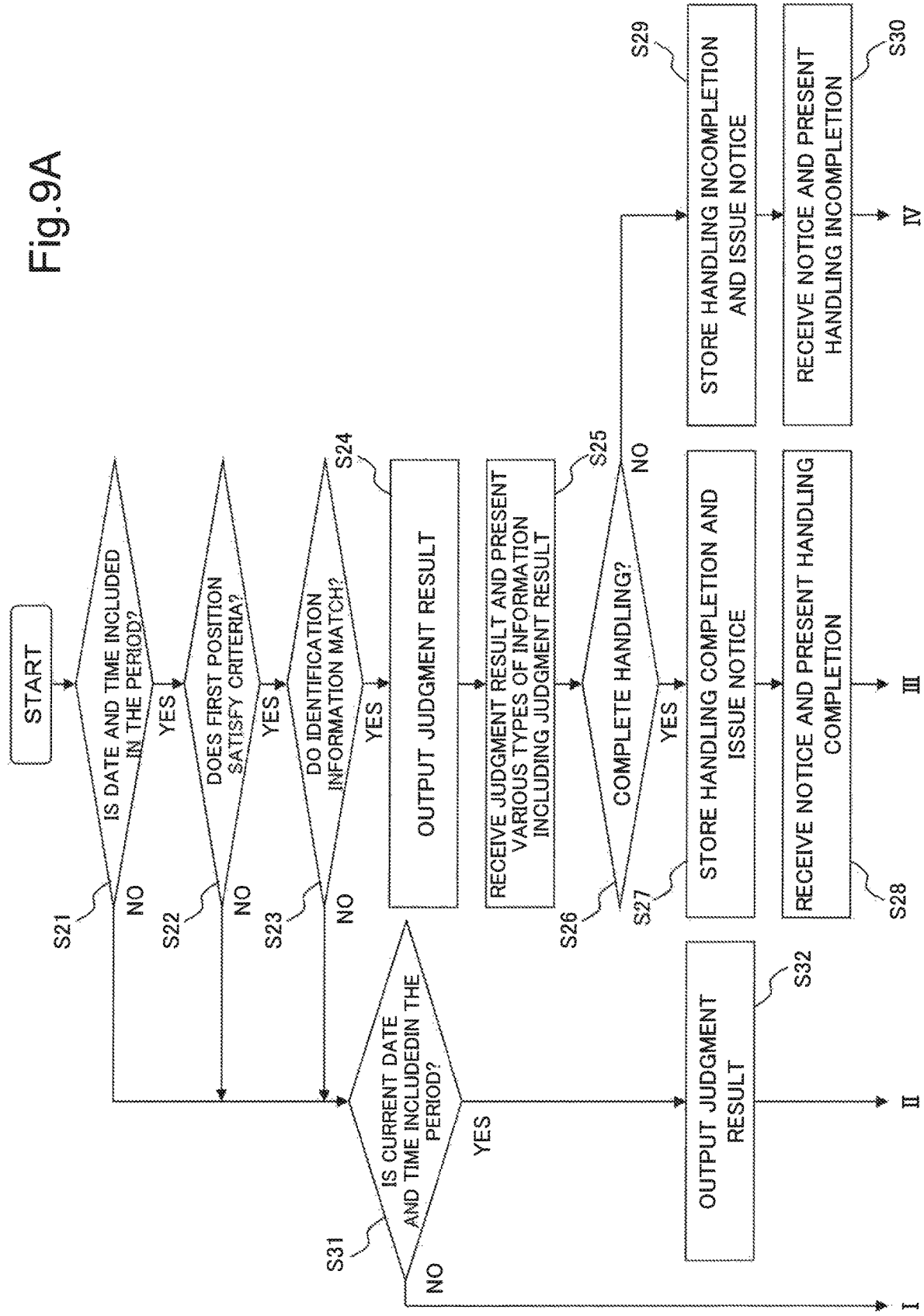

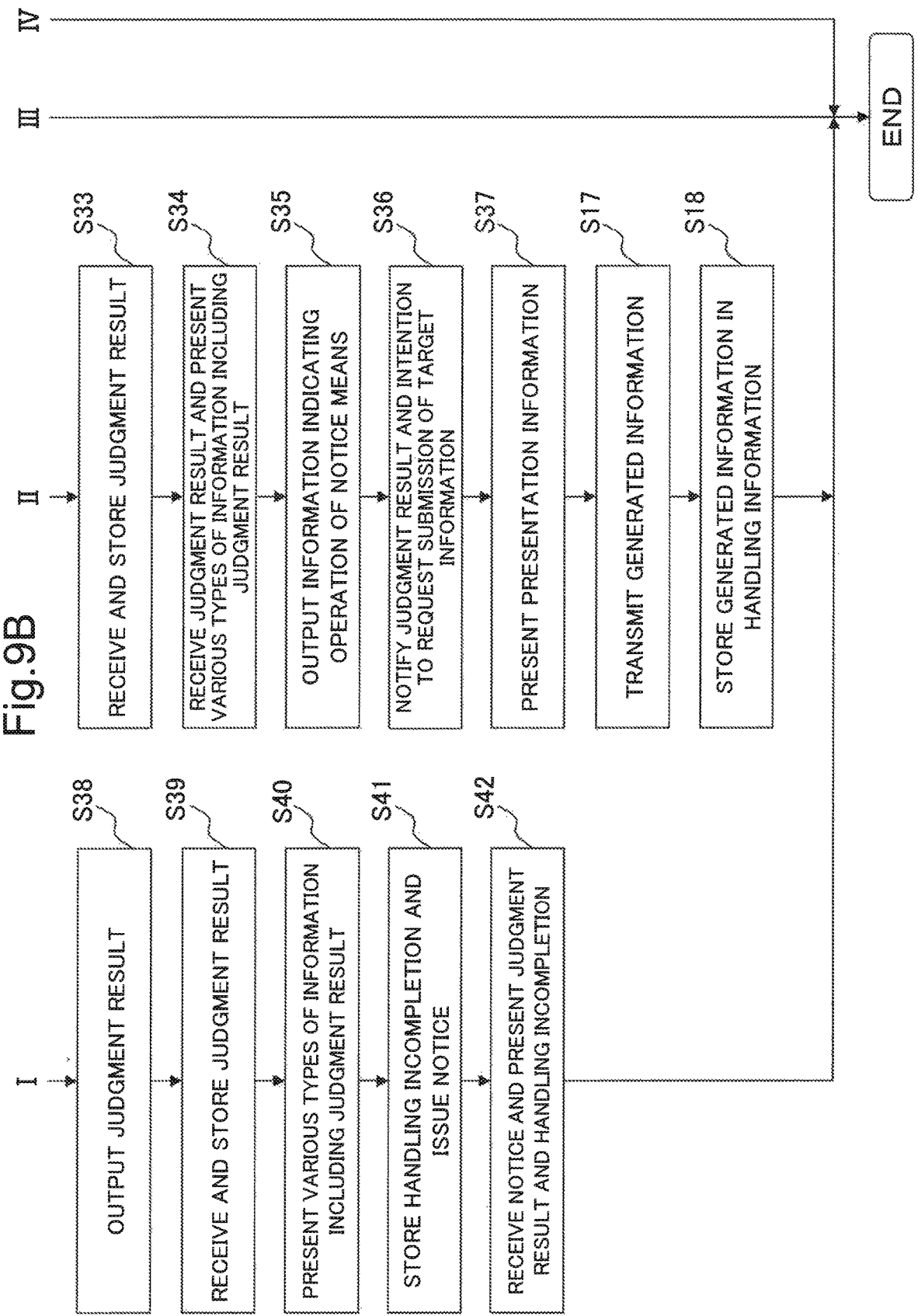

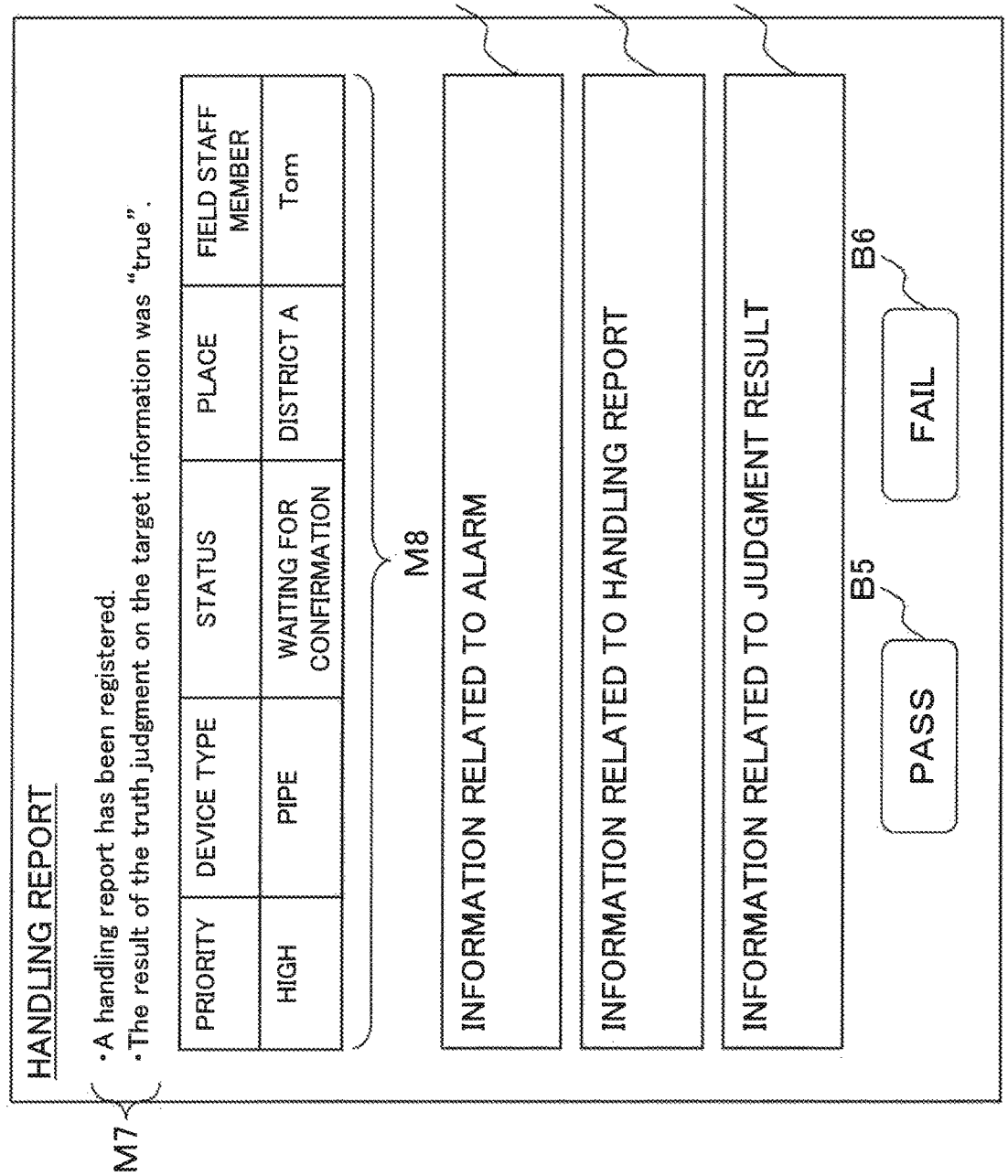

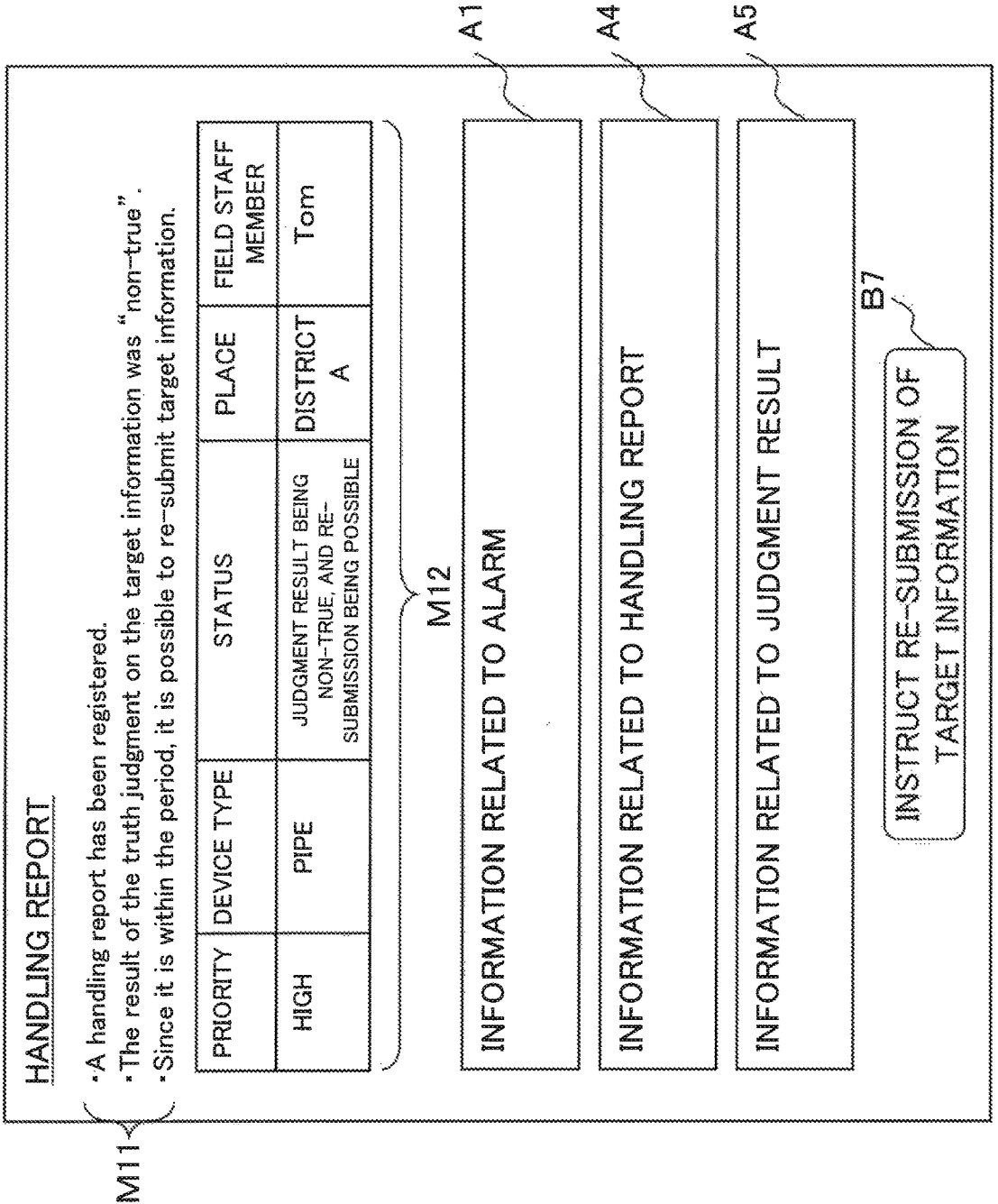

Fig.13

RE-SUBMISSION INSTRUCTION NOTICE

・A handling report has been registered.
・The result of the truth judgment on the target information was "non-true".
・Please generate target information again, and report the handling.

| PRIORITY | DEVICE TYPE | STATUS | PLACE | REQUIRED TIME ESTIMATE |
|---|---|---|---|---|
| HIGH | PIPE | JUDGMENT RESULT BEING NON-TRUE | DISTRICT A | TEN MINUTES |

M14

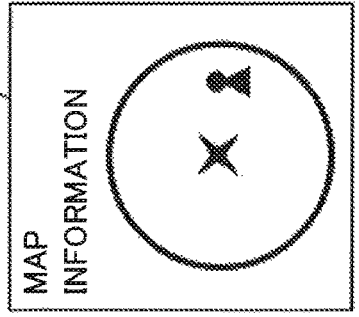

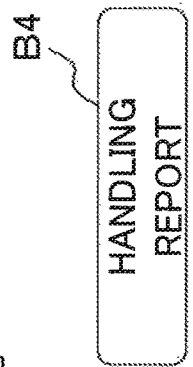
MAP INFORMATION — A2

HANDLING REPORT — A3

GENERATE TARGET INFORMATION — B1

HANDLING REPORT — B4

M13

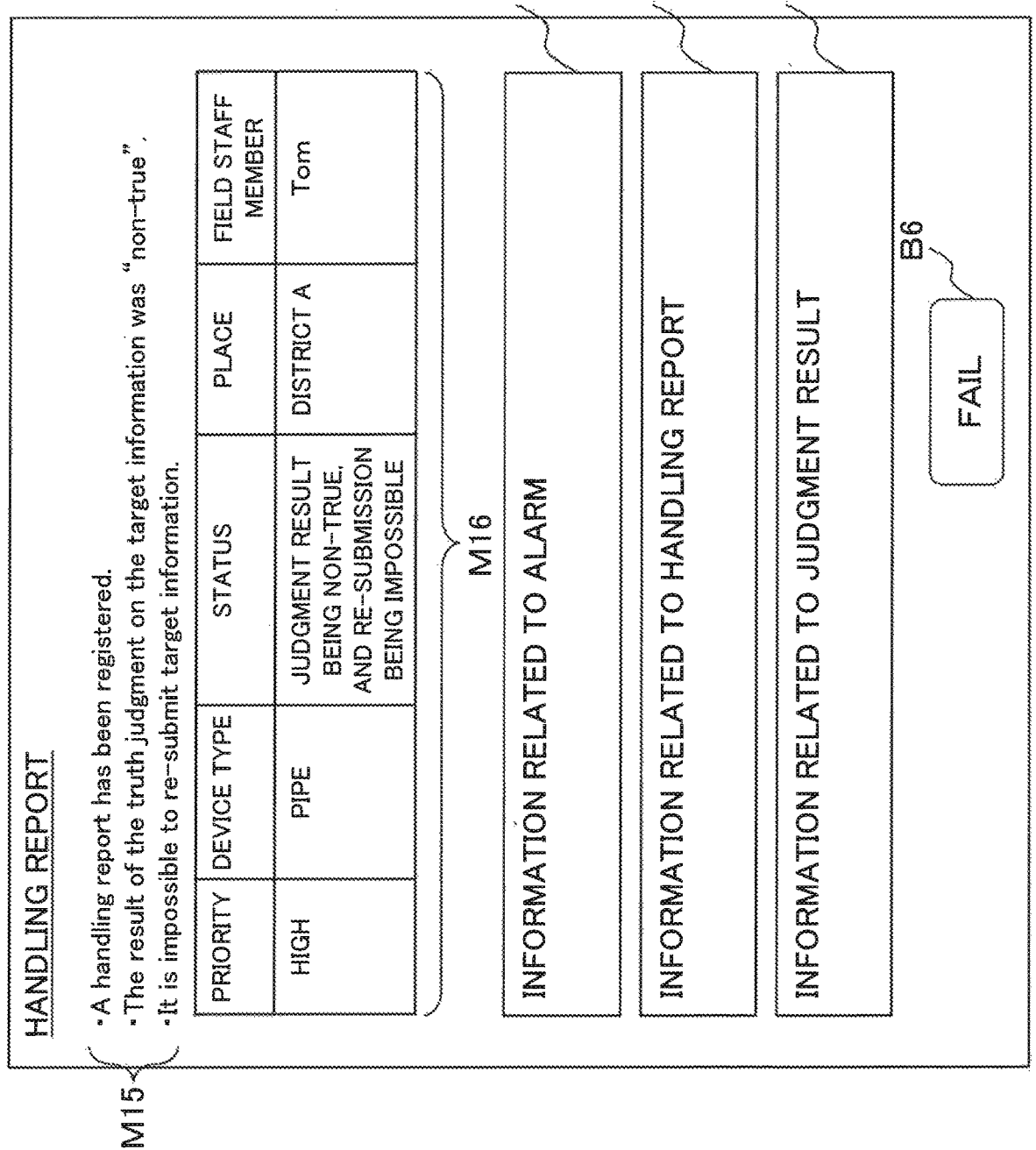

CONFIRMING FIELD TECHNICIAN WORK BASED ON PHOTOGRAPHIC TIME AND LOCATION DEVICE

This application is a National Stage Entry of PCT/JP2017/008426 filed on Mar. 3, 2017, which claims priority from Japanese Patent Application 2016-045360 filed on Mar. 9, 2016, the contents of all of which are incorporated herein by reference, in their entirety.

TECHNICAL FIELD

The present invention relates to a technical field of judging a truth of information related to a target of interest.

BACKGROUND ART

In plants such as power plants, centralized monitoring centers (hereinafter referred to as "center"), equipment, and the like, may be dotted over wide regions. Thus, in operation of plants, a center is assigned a different role from a role of a field that includes equipment and the like (hereinafter simply referred to as "field"). In other words, a center operates a different task than a field does.

To be more specific, a role played by a center includes analysis of plant operation, diagnosis and optimization when any failure or abnormality has occurred (hereinafter simply referred to as "abnormality"), and evaluation on operations such as maintenance operation. That is, a center has a role of generally managing the plant. On the other hand, the role played by a field includes such operations as exchange, repair, and regular maintenance of devices by a field staff member in the field (hereinafter simply referred to as "field staff member").

As described above, in a center, a few people are required to manage the plant in pursuing their respective roles. For example, even in a supply chain management (SCM) in which a plurality of bases are dispersed widely, a few people in a center have to manage each of the bases. On the other hand, in a field, each field staff member is assigned a base, an operation field or a location that he or she is in charge. This makes it necessary to procure many field staff members in a field.

For this reason, the following is required of a plant management system that manages a plant, so as to tie a center to a field and to manage a plurality of equipment, facilities, and the like. First of all, the plant management system is required to centrally manage the information dealt with in the centers and the information dealt with in the fields, for achieving information consistency.

Second of all, the plant management system is required to provide optimal information depending on a role of a user including a manager of a center or a field staff member, an occasion in which the information is used, and a device to be used. In other words, the plant management system is required to display optimal information on a screen such as a display, in a display mode which is recognizable by a user.

To be more specific, in a center, the plant management system is required to present a screen display in a display mode in which all things can be overlooked in normal times; however, in emergency, the plant management system is required to present a screen display in a display mode in which a failed portion is focused. In addition, in a field, the plant management system is required to present solely information that relates to the location at which the field staff member is located, on a screen of a mobile terminal of the field staff member, for example.

Third of all, the plant management system is required to be a system that assists cooperation between the centers and the fields, and retains the work history that the centers and the fields went through.

PTL 1 through PTL 6 are exemplary techniques that concern these requests. PTL 1 discloses a technique that relates to a support system for automating operation. The support system for automating operation automatically executes work items described in the work instructions. The support system for automating operation also registers, in the database, information representing achievements of a work having been executed as an execution evidence. The support system for automating operation displays the correlation between the registered execution evidence and the work item, on a display unit which the client carries.

PTL 2 discloses a technique that relates to a schedule managing method for managing a schedule of a field staff member. In the schedule managing method, the work result sent from the field staff member is stored in the storage unit. Also in the schedule managing method, a schedule chart that represents the work result in the storage and the pre-set operation schedule is displayed on a managing server.

PTL 3 discloses a technique that relates to monitoring and management apparatus and the like, using electronic mail that represents the situation of a monitoring target. The monitoring and management apparatus identifies the type of electronic mail on the basis of the content of the received electronic mail. In addition, the monitoring and management apparatus accumulates, for each identified type, the content of the electronic mail in the database.

PTL 4 discloses a technique that relates to a supporting apparatus for supporting a task of collecting an accident site information (hereinafter referred to as "supporting apparatus"). The supporting apparatus collects information related to a scene of an accident. The supporting apparatus stores accident-related information related to an accident heard from a customer, in a database server. When information related to the accident is requested by a field terminal apparatus operated by a staff member who has visited the scene of the accident, the supporting apparatus extracts the requested information from the accident-related information in storage. The supporting apparatus transmits the extracted accident-related information, to the field terminal apparatus. The staff member can investigate on the scene of the accident on the basis of the transmitted accident-related information. The supporting apparatus stores, in the database server, the investigation result of the staff member, in a state associated with the accident-related information.

PTL 5 discloses a technique that relates to a supporting apparatus for supporting a task of classifying a difficulty categorized subject (hereinafter referred to as classifying-task supporting apparatus"). The classifying-task supporting apparatus decides a person to process the task depending on the difficulty associated with the appraisal processing of the accident. The classifying-task supporting apparatus refers to a criteria table defined in advance on the basis of the content of the accident-related information. The classifying-task supporting apparatus judges the difficulty of the appraisal processing of the accident on the basis of the accident-related information and the criteria table. The classifying-task supporting apparatus stores, in the database server, the judgment result as difficulty information, by including the judgment result in the accident-related information. By doing so, the manager can decide the person to process the appraisal processing on the basis of the difficulty information.

PTL 6 discloses a technique that relates to an inspection system and an inspection method. The inspection system judges whether or not the inspection field staff member has visited each inspection place, by comparing, for each inspection place, inspection position information representing the position of the inspection place and the positional information of the mobile terminal which the inspection field staff member carries. In addition, the inspection system judges whether any inspection action is required at the inspection place where the inspection field staff member is located on the basis of the inspection action information representing the inspection action to be executed at each inspection place. The inspection system outputs these judgment results to the display unit of the mobile terminal. As a result, the inspection system can detect failure of the inspection field staff member to visit inspection places, to execute inspection actions, or the like. The inspection system can also present the detection result to the inspection field staff member.

As described so far, the techniques disclosed in PTL 1 to PTL 6 summarized above can handle the request given to the plant management system. For example, the technique can accumulate various types of information such as execution evidence and work result, in the database, the database server, or the like. That is, the technique can centrally manage the various types of information. Also with the technique, the operation progress and the various types of information can be shared among the related parties involved in the operation on the basis of the accumulated various types of information. Thus, the technique allows display of various types of information for each field staff member, on the terminal carried by the field staff member, for the purpose of sharing the various types of information with others.

CITATION LIST

Patent Literature

[PTL 1] Japanese Patent Publication No. 5750334
[PTL 2] Japanese Patent Application Publication No. 2002-169938
[PTL 3] Japanese Patent Application Publication No. 2001-202298
[PTL 4] Japanese Patent Application Publication No. 2004-126807
[PTL 5] Japanese Patent Application Publication No. 2004-126808
[PTL 6] Japanese Patent Application Publication No. 2011-248404
[PTL 7] Japanese Patent Application Publication No. 2012-141831

SUMMARY OF INVENTION

Technical Problem

In the above-described plant management system, for example when an alarm is issued upon detecting an abnormality in the equipment, the center occasionally instructs a field staff member to handle the abnormality. In response to the instruction from the center, the field staff member handles the abnormality, and then captures a picture including the device to be handled or the portion of the abnormality of the device, as an evidence that he or she has handled the abnormality. The field staff member is also known to submit the captured picture as conclusive evidence information, to a center's manager, for example. The manager can determine that the handling in response to the instruction has been complete, by confirming the submitted picture.

However, in an approach to confirm pictures, there is always a possibility of misjudgment on the handling completion; for field staff members can submit a picture of disguise that looks as if the handling is complete even when in reality such handling is not complete. In other words, the field staff member may submit wrong conclusive evidence information. When such wrongdoing is committed, the plant may possibly incur enormous loss. To counter such a problem, the center's manager must judge the truth of the submitted picture, for example. However, in a judgment approach for a manager to judge the truth of a picture, the truth criteria may be dependent on the manager. That is, that judgment approach has problem that it is highly dependent on the individual skills. Therefore, with the judgment approach, the judgement accuracy is likely to be degraded. Moreover, the judgment approach is inefficient and the truth judgment takes time.

PTL 7 provides an exemplary technique that solves the problem pertaining to such judgment approach. PTL 7 discloses a technique that relates to a management system that manages a picture of the field captured in the construction work and the construction progress. The management system includes a first mobile terminal carried by a field overseer, a second mobile terminal carried by a manager, and a data storage/analysis server. The first mobile terminal transmits, to the data/analysis server, the time information and the positional information on the construction field acquired using the global positioning system (GPS) function. The first mobile terminal also transmits, to the data/ analysis server, the picture data to which the geocode of the construction field acquired using the image-capturing function is added. The data/analysis server judges whether or not the positional information transmitted from the first mobile terminal matches the positional data of the construction field registered in advance, or if there is an approximate value. In addition, the data/analysis server judges whether or not the information indicated by the geocode matches the positional information, by analyzing the geocode added to the picture data. By doing so, PTL 7 can judge whether or not the picture data that includes the construction field is true. PTL 7 also discloses the following technique. That is, in the technique, PTL 7 judges whether or not there is no delay in the term of works of the construction work compared to the schedule of the predetermined standard process on the basis of the information indicating the captured time added to the picture data. In PTL 7, the judgment result is transmitted to the first mobile terminal. The first mobile terminal displays the judgment result on the display means.

However, with the positional information of the construction field, it may not be possible to judge whether or not the picture data are captured on the date and time at which the picture date should be captured. For example, assume a case where the field overseer forgot to capture the picture data of the construction field, and captured the picture data of the construction field on a later day. In that case, too, such management system may judge that the picture data are true, even when they are taken after the date and time to be captured. In other words, PTL 7 still cannot judge the truth of the picture data with more accuracy, in the case of disguise in the picture data captured in the construction field.

PTL 1 to PTL 6 neither consider nor describe an approach to judge the truth of the conclusive evidence information such as the picture data captured in the construction field, nor do PTL 1 to PTL 7 consider or describe an approach to provide information to be provided for a user, in accordance with the result of judgment on the truth. That is, PTL 1 to PTL 7 merely describes displaying information on a display means such as a display, for the purpose of sharing the information with others.

A main objective of the present invention is to provide an information processing system or the like that, even when target information related to a target of interest is disguised, can detect the disguise with more accuracy, and provide appropriate information to be provided for a user, in accordance with the detection result.

Solution to Problem

So as to achieve the above-described problem, an information processing system according to one aspect of the present invention includes the following configuration.

An information processing system includes a server apparatus and a client communicably coupled to the server apparatus via a communication network.

The server apparatus judges whether or not target information related to a target of interest is true, based at least on information representing a date and time and a first position at which the target information is generated and based on a judgment condition for judging whether the target information is true or not, and the server apparatus provides a judgment result to the client when the target information is judged to be non-true.

The client controls presentation means to present presentation information to a user who uses the client, in a mode recognizable by the user, in accordance with the judgment result in the server apparatus, and presents, to the user by controlling the presentation means, the presentation information instructing at least submission of new target information in accordance with the judgment result indicating non-true.

So as to achieve the above-described objective, a server apparatus according to one aspect of the present invention includes the following configuration.

A server apparatus judges whether or not target information related to a target of interest is true, based at least on information representing a date and time and a first position at which the target information is generated and based on a judgment condition for judging whether the target information is true or not, and the server apparatus provides a judgment result to a client used by a user when the target information is judged to be non-true.

So as to achieve the above-described objective, a client according to one aspect of the present invention includes the following configuration.

A client, in accordance with a judgment result performed by a server apparatus on whether or not target information related to a target of interest is true, controls presentation means to present presentation information to be presented to a user who uses client, in a mode recognizable by the user, and the client presents, to the user by controlling the presentation means, the presentation information instructing at least submission of new target information when the server apparatus has judged that the target information is non-true.

So as to achieve the above-described objective, an information processing method according to one aspect of the present invention includes the following configuration.

An information processing method is performed by an information processing system including a server apparatus and a client communicably coupled to the server apparatus via a communication network.

In the server apparatus, whether or not target information related to a target of interest is true is judged, based at least on information representing a date and time and a first position at which the target information is generated and based on a judgment condition for judging whether the target information is true or not, and a judgment result is provided to the client when the target information is judged to be non-true.

In the client, presentation means is controlled to present presentation information to a user who uses the client, in a mode recognizable by the user, in accordance with the judgment result in the server apparatus, and the presentation information instructing at least submission of new target information is presented to the user by controlling the presentation means, in accordance with the judgment result indicating non-true.

This objective can also be achieved by a computer program realizing, by means of a computer, an information processing system, an information processing method, a server apparatus, and a client having the above-stated configurations, and by a computer-readable recording medium that stores the computer program.

Advantageous Effects of Invention

Even when target information related to a target of interest is disguised, the present invention can detect the disguise with more accuracy, and provide appropriate information to be provided for a user, in accordance with the detection result.

BRIEF DESCRIPTION OF DRAWINGS

FIG. 7 is a diagram specifically representing a display mode of a UI in the presentation unit presenting information representing request content to a manager when requesting that a field staff member handle the detected abnormality (handling request confirmation screen).

FIG. 8 is a diagram specifically representing a display mode of a UI in the presentation unit presenting presentation information representing request content to a field staff member when a manager requested that the field staff member handle the detected abnormality (handling request notice screen).

FIG. 9A is a flowchart (1/2) representing a truth judgment operation on target information performed by the plant monitoring system according to the third example embodiment of the present invention.

FIG. 9B is a flowchart (2/2) representing the truth judgment operation on target information performed by the plant monitoring system according to the third example embodiment of the present invention.

FIG. 10 is a diagram specifically representing a display mode of a UI, when a judgment result indicates that target information is true, in the presentation unit presenting, to a manager, information including the judgment result and handling contents reported by a field staff member (first handling report screen).

FIG. 12 is a diagram specifically representing a display mode of a UI, when the judgment result indicates that the target information is non-true and it is possible to submit new target information, in the presentation unit presenting, to the manager, information including the judgment result and the handling contents reported by a field staff member (second handling report screen).

FIG. 13 is a diagram specifically representing a display mode of a UI, when the judgment result indicates that the target information is non-true and it is possible to submit new target information, in the presentation unit presenting relevant presentation information to a user.

FIG. 14 is a diagram specifically representing a display mode of a UI, when the judgment result indicates that the target information is non-true and it is impossible to submit new target information, in the presentation unit presenting, to the manager, information including the judgment result and the handling contents reported by a field staff member (third handling report screen).

EXAMPLE EMBODIMENT

The following details example embodiments according to the present invention with reference to the drawings.

First Example Embodiment

Figure 1:
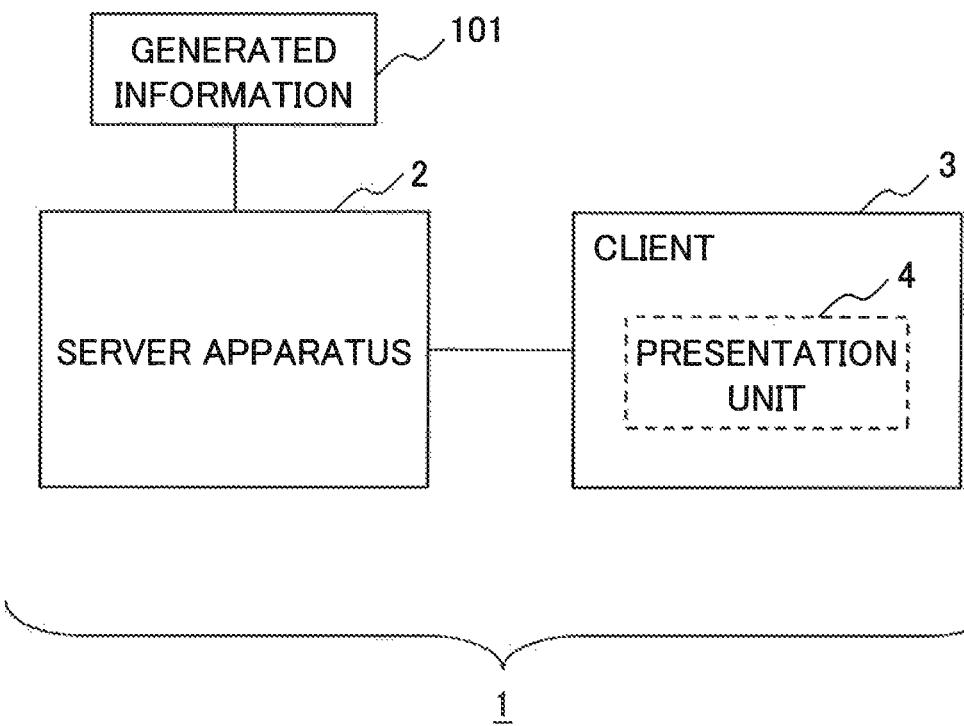
FIG. 1 is a block diagram representing a configuration of an information processing system according to a first example embodiment of the present invention.

FIG. 1 is a block diagram representing a configuration of an information processing system 1 according to a first example embodiment of the present invention.

In FIG. 1, the information processing system 1 includes a server apparatus 2 and a client 3. The server apparatus 2 and the client 3 are connected to each other to be communicable via a communication network, for example.

The server apparatus 2 judges whether target information is true on the basis of both information and a judgment condition. The information represents at least the date and time and represents the position (hereinafter referred to as the "first position") at which the target information related to a target of interest (not illustrated in the drawings) is generated. And the judgment condition is a condition for judging whether the target information is true or not. However, in the present example embodiment, information information including the above information at least representing the date and time and the first position is referred to as "generated information 101", for the convenience of explanation.

The following explanation explains, in greater details, the operation performed by the server apparatus 2 to judge (truth judgment) whether or not the target information is true or not.

The server apparatus 2 executes the following processing, in response to being provided with the generated information 101 by an external apparatus (not illustrated in the drawings), for example. That is, the server apparatus 2 judges whether or not the date and time at which the target information is generated is included in the period starting from the time to start generation of the target information to when the time allowed to be taken before generation of the target information (also referred to as "postponement time" in the present application) has passed. In other words, the server apparatus 2 judges whether or not the date and time included in the generated information 101 is included in that period. In addition, the server apparatus 2 judges whether or not the first position at which the target information is generated satisfies a criteria of including the position (hereinafter referred to as the "second position") indicating the location of the target of interest. An example of the criteria and the truth judgment approach will be explained in greater details in the third example embodiment.

As a result of the judgment, when judging that the date and time is included in that period, and that the first position satisfies the criteria, the server apparatus 2 judges that the target information is true. On the other hand, when judging that the date and time is not included in that period or that the first position does not satisfy the criteria, the server apparatus 2 judges that the target information is non-true.

The server apparatus 2 provides the client 3 with the judgment result. That is, when having judged that the target information is non-true, the server apparatus 2 provides the client 3 with that judgment result. In addition, in providing the client 3 with the judgment result, the server apparatus 2 judges whether it is within the period during which new target information can be generated. In other words, the server apparatus 2 judges whether or not the current date and time falls within the period starting from the time to start generation of the target information to when the time allowed to be taken before generation of the target information (postponement time) has passed. When having judged that the current date and time is included in that period, the server apparatus 2 provides the client 3 with the judgment result.

The target of interest indicates a plant for performing predetermined processing, such as a chemical plant, an oil refining plant, and an iron-manufacturing plant, for example. The target of interest may also be various types of devices constituting a plant. Alternatively, the target of interest may include a system that outputs information related to the performance or the environment of the system, or the like. The target of interest may adopt a configuration that includes various types of sensors that can measure a temperature, a pressure, an oscillation, a power, a voltage, an electric current, and the like of each portion of the target of interest. However, the present invention explained by way of the present example embodiment is not limited to the configuration described above.

For example, the target information is assumed to include at least any one of the information below.

Image information and moving image information including the target of interest captured at the date and time and at the first position Sound information recorded at the date and time and at the first position Log information recorded in the target of interest and having been acquired at the date and time and at the first position In addition, the target information is information generated, for example, in any one of the cases in which: handling is performed on the phenomenon detected in relation to the target of interest; such handling is not performed; and an operation defined in relation to the target of interest is performed. Alternatively, the target information may be information generated at each predetermined cycle. In such case, the phenomenon detected in relation to the target of interest is assumed to represent at least any one of abnormality, failure, fault, and the like, which has been detected in relation to the target of interest, as an example. However, the present invention explained by way of the present example embodiment is not limited to the configuration described above.

To be more specific, in a case in which such phenomenon is handled, for example, the target information is assumed to include information representing an evidence of the handling. For example, when an operation defined in relation to the target of interest is performed, the target information is assumed to include information representing an evidence that the operation has been performed. In other words, in such a case, the target information is information by which a user can be aware of whether or not the handling or the operation has been performed, for example.

The client 3 controls the presentation unit 4 thereby presenting the presentation information to be presented to a user who uses the apparatus, in a mode recognizable by the user, in accordance with the judgment result of the server apparatus 2.

To be more specific, the client 3 controls the presentation unit 4 thereby presenting, to a user, relevant presentation information to instruct at least submission of new target information on the basis of the judgment result indicating non-true.

Figure 16:
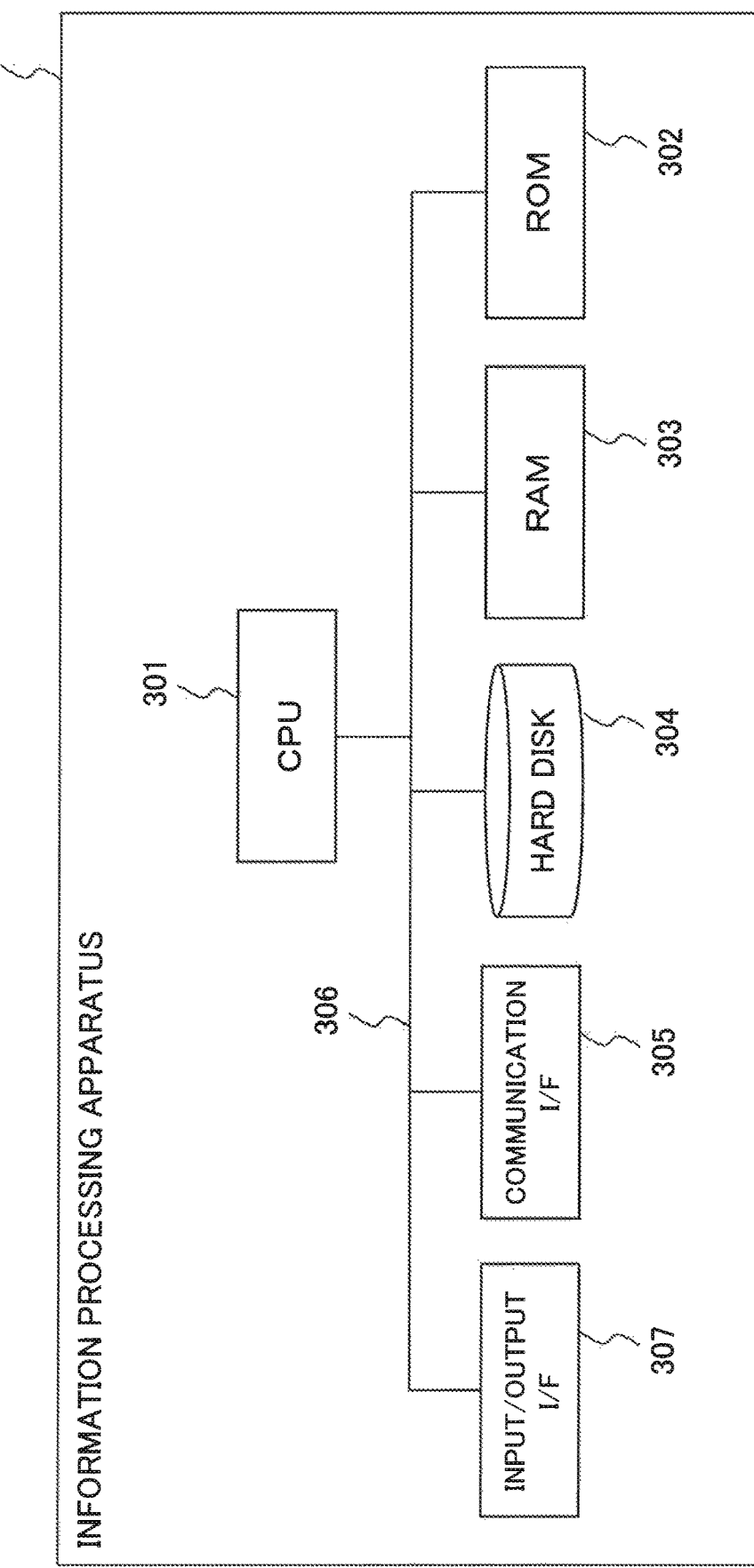
FIG. 16 is a block diagram exemplifying a hardware configuration of an information processing apparatus that can realize at least a function such as the judgment unit, in the information processing system and the plant monitoring system in each example embodiment.

The presentation unit 4 has a function to present relevant presentation information, for example in a mode recognizable by a user, in response to being controlled by the client 3. To be more specific, the presentation unit 4 may adopt an input/output interface such as an input device such as a touch panel and a display (e.g., the input/output interface 307 as illustrated in FIG. 16), for example. An example of the user interfaces provided by the presentation unit 4 will be explained in greater details in the third example embodiment.

Figure 2:
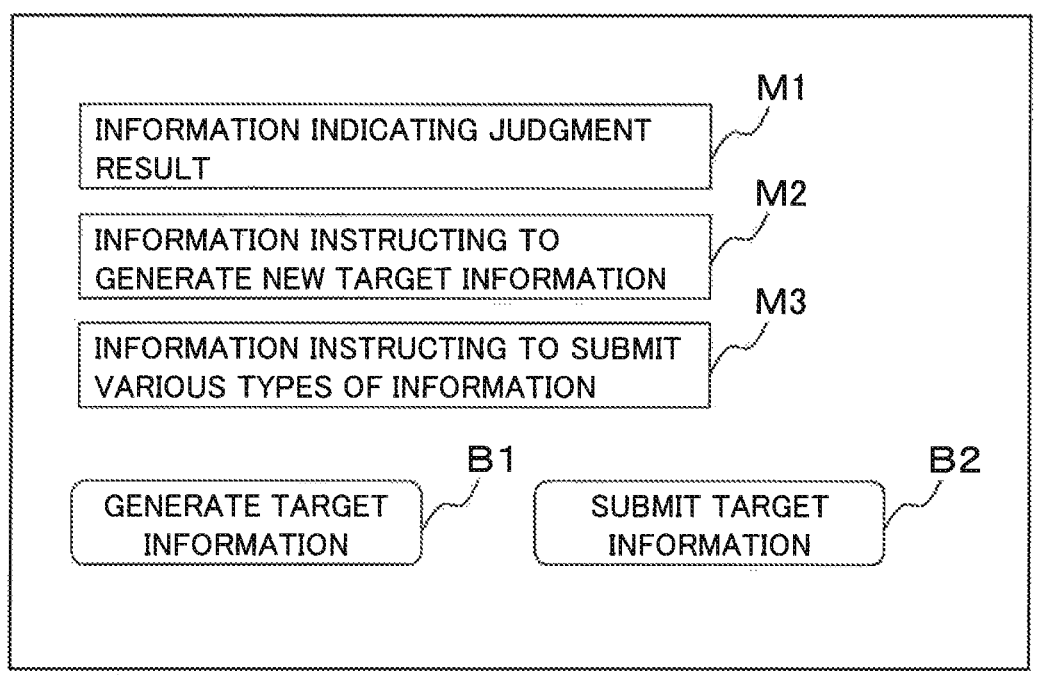
FIG. 2 is a diagram conceptually exemplifying a display mode of a user interface (UI) by which, when the judgment result indicates that the target information is non-true, a presentation unit presents relevant presentation information to a user.

To be more specific, the following describes a user interface (UI) provided by the presentation unit 4 controlled by the client 3, with reference to FIG. 2.

FIG. 2 is a diagram conceptually exemplifying a mode in which the presentation unit 4 presents presentation information to a user in the first example embodiment of the present invention. That is, FIG. 2 is a diagram conceptually exemplifying a display mode of a user interface (UI) by which, when the judgment result indicates that the target information is non-true, the presentation unit 4 presents presentation information to a user.

As an example of the display mode, the user interface provided by the presentation unit 4 is assumed to include at least the following, as illustrated in FIG. 2.

Information indicating the judgment result by the judgment unit 13 (M1 illustrated in FIG. 2)

Information instructing to generate new target information (M2 illustrated in FIG. 2)

Information instructing to submit new target information as well as information on the date and time and the first position at which the new target information is generated (M3 illustrated in FIG. 2)

A means that operates the generating means that can generate new target information (e.g., the information generation unit 29 illustrated in FIG. 5) on the basis of a user operation (the generation button to "generate target information" illustrated in B1 in FIG. 2)

Figure 5:
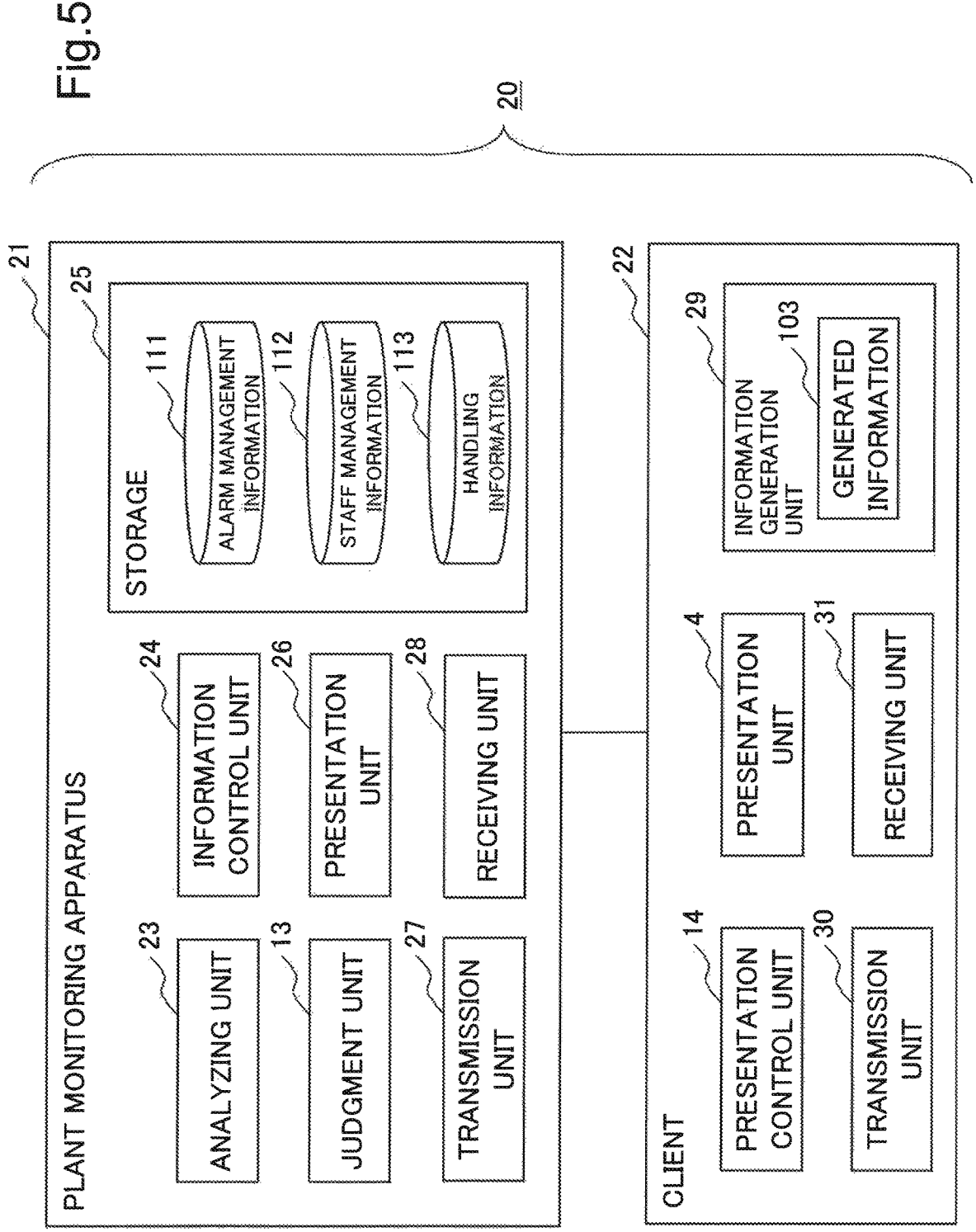
FIG. 5 is a block diagram representing a configuration of a plant monitoring system according to a third example embodiment of the present invention.

A means that operates the submitting means that can submit the generated information 101 that includes the new target information and information on the date and time and the first position (e.g., the presentation control unit 14 and the transmitting unit 30 illustrated in FIG. 5) on the basis of a user operation (the submit button to "submit target information" illustrated in B2 in FIG. 2).

On the other hand, when the judgment result indicates that the target information is true, the user interface provided by the presentation unit 4 is assumed to at least include information representing the judgment result of the judgment unit 13 (e.g., M1 illustrated in FIG. 2).

Note that, for the convenience of explanation, the present example embodiment has been explained by way of an exemplary user interface provided by the presentation unit 4 having a configuration including information representing a judgment result, information representing various types of instructions, and various types of buttons. However, the example embodiment according to the present invention is not limited to such configuration. For example, the user interface may adopt a configuration that additionally includes various types of information to be presented to a user, such as map information indicating a location of a user and a location of a target of interest. Other display modes will be explained in greater details in the third example embodiment.

Even when target information related to a target of interest is disguised, the information processing system 1 according to the present example embodiment can detect the disguise with more accuracy, and provide appropriate information to be provided for a user, in accordance with the detection result, for the following reasons.

That is, the server apparatus 2 can judge whether or not the target information is true on the basis of the information at least representing the date and time and the first position at which the target information is generated as well as a judgment condition. Therefore, the information processing system 1 can perform the truth judgment on target information with more accuracy without forcing the manager to engage in any troublesome operation, for example. In other words, the information processing system 1 can not only eliminate elements of individual skills in the truth judgment of the target information, but also can improve the processing speed of the truth judgment.

Secondly, the client 3 can control the presentation unit 4 to present presentation information to be presented to a user who uses the apparatus, in a mode recognizable by the user, in accordance with the judgment result of the server apparatus 2. For example, the client 3 can present, to a user, presentation information to at least instruct submission of new target information by controlling the presentation unit 4, when the server apparatus 2 judged that the target information is non-true. That is, the information processing system 1 can present, to the user, presentation information representing an action to be taken by the user next, in accordance with the result of judgment on whether or not the target information is true. Accordingly, a user using the client 3 can recognize that submission of new target information is necessary, by the presentation information presented on the presentation unit 4. In addition, the user can generate such new target information, and submit the generated target information.

Second Example Embodiment

The following explains the second example embodiment that is based on the information processing system 1 according to the first example embodiment of the present invention described above. The following explanation focuses on the characteristic portions of the present example embodiment. In the explanation, the configuration same as that of the above-explained example embodiment will not be explained by assigning the same reference numeral.

The information processing system 10 according to the second example embodiment of the present invention is described with reference to FIG. 3 and FIG. 4.

Figure 3:
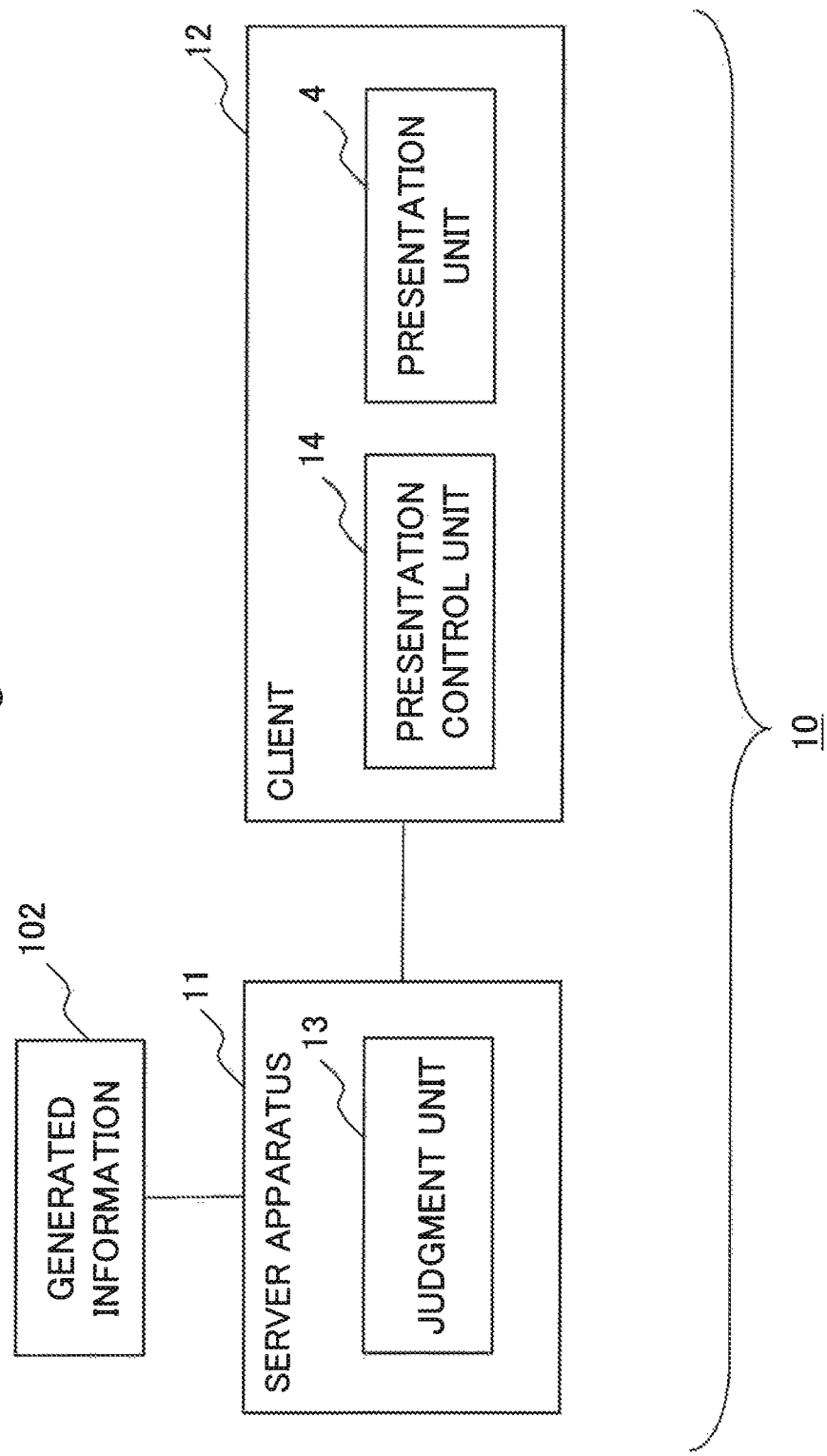
FIG. 3 is a block diagram representing a configuration of an information processing system according to a second example embodiment of the present invention.

FIG. 3 is a block diagram representing a configuration of an information processing system 10 according to the second example embodiment of the present invention. In FIG. 3, the information processing system 10 includes a server apparatus 11 and a client 12. The server apparatus 11 includes a judgment unit 13. The client 12 includes a presentation control unit 14 and a presentation unit 4.

In the present example embodiment, the function of the presentation control unit 14 of the client 12 corresponds to the function of the client 3 explained in the first example embodiment. In other words, the presentation control unit 14 controls the presentation unit 4 to present presentation information to be presented to a user who uses the apparatus, in a mode recognizable by the user, in accordance with the judgment result of the judgment unit 13 in the server apparatus 11.

In addition to the function of the server apparatus 2 explained in the first example embodiment, the judgment unit 13 of the server apparatus 11 further has the following function. That is, the judgment unit 13 further judges whether target information is true on the basis of identification information that can identify a target of interest, which is acquired from the target of interest (the identification being hereinafter referred to as the "first identification information"), and a judgment condition on the basis of which the target information is judged whether or not it is true.

The following explains in greater details an operation to judge whether or not target information is true (truth judgment) performed by the judgment unit 13.

The judgment unit 13 judges whether or not first identification information acquired from a target of interest matches identification information (this identification information being hereinafter referred to as the "second identification information") defined in advance with respect to the target of interest.

As a result of the judgment, when the judgment unit 13 judges that the first identification information matches the second identification information, the target information is judged to be true. On the other hand, the judgment unit 13 judges that the target information is non-true, when the first identification information is judged not to match the second identification information.

In this case, various types of information can be adopted as the first and second identification information, as long as the information can identify the target of interest. For example, when the target of interest is a device, device information may be adopted as the first and second identification information. For example, a management numeral assigned to the target of interest in advance may be used as the first and second identification information. Alternatively, an item name of a target of interest and a machine having manufactured the target of interest may be adopted as the first and second identification information. However, the present invention explained by way of the present example embodiment is not limited to the configuration described above.

(Operation of the Information Processing System 10)

The following is a more specific explanation of the operation of the information processing system 10 according to the present example embodiment.

In the present example embodiment, the generated information 102 is assumed to be information including the date and time and the first position at which the target information is generated and the first identification information. That is, the generated information 102 is different from the generated information 101 in its configuration of further including the first identification information.

Figure 4:
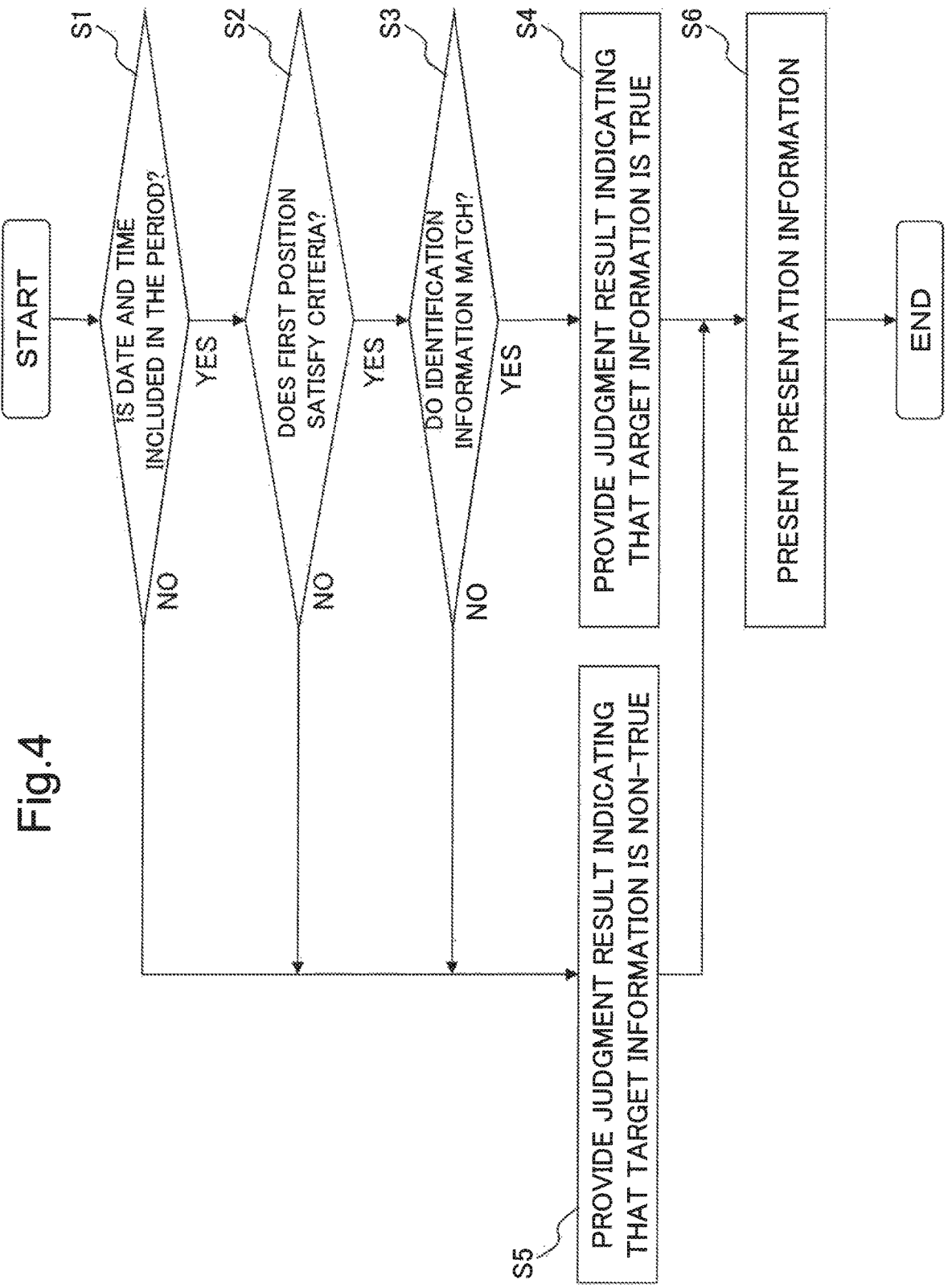
FIG. 4 is a flowchart representing an operation performed by the information processing system according to the second example embodiment of the present invention.

FIG. 4 is a flowchart representing an operation performed by the information processing system 10 according to the second example embodiment of the present invention. The operational procedure of the information processing system 10 is explained with reference to the flowchart.

The judgment unit 13 starts processing in response to being provided with the generated information 102. That is, the judgment unit 13 judges whether or not the date and time included in the generated information 102 is included in the period starting from the time to start generation of the target information to when the time allowed to be taken before generation of the target information has passed (Step S1).

As a result of the judgment, when judging the date and time is included in that period, the judgment unit 13 proceeds the processing to Step S2 ("YES" in Step S1). On the contrary, when judging that the date and time is not included in that period, the judgment unit 13 proceeds the processing to Step S5 ("NO" in Step S1).

In Step S2, the judgment unit 13 judges whether or not the first position included in the generated information 102 satisfies the criteria of including the second position representing the location of the target of interest.

As a result of the judgment, when judging that the first position satisfies the criteria, the judgment unit 13 proceeds the processing to Step S3 ("YES" in Step S2). On the contrary, when judging that the first position does not satisfy the criteria, the judgment unit 13 proceeds the processing to Step S5 ("NO" in Step S2).

In Step S3, the judgment unit 13 judges whether or not the first identification information included in the generated information 102 matches the second identification information defined with respect to the target of interest in advance.

As a result of the judgment, when judging that the first identification information matches the second identification information, the judgment unit 13 proceeds the processing to Step S4 ("YES" in Step S3). On the contrary, when judging that the first identification information does not match the second identification information, the judgment unit 13 proceeds the processing to Step S5 ("NO" in Step S3).

Note that, for the convenience of explanation, the present example embodiment has been explained above by way of the judgment unit 13 proceeding the processing in an order of Step S1, S2 and S3. However, the example embodiment according to the present invention is not limited to such configuration. The judgment unit 13 can perform the processing in other orders than the above-described order, as long as the three kinds of processing (Step S1, S2, and S3) are performed.

In Step S4, the judgment unit 13 provides the client 12 with a judgment result indicating that the target information is true.

In Step S5, the judgment unit 13 provides the client 12 with a judgment result indicating that the target information is non-true.

The presentation control unit 14 of the client 12 controls the presentation unit 4 to present presentation information to be presented to a user who uses the apparatus, in a mode recognizable by the user, in accordance with the judgment result provided by the judgment unit 13 (Step S6).

As described so far, with the information processing system 10 according to the present example embodiment, the effect explained in the first example embodiment can be achieved, and in addition, even when target information related to a target of interest is disguised, the disguise can be detected with more accuracy.

The following states the reason. That is, the judgment unit 13 performs truth judgment of target information on the basis of not only the date and time and the first position at which the target information is generated but also first identification information that can identify the target of interest and a judgment condition.

Third Example Embodiment

The following explains the third example embodiment that is based on the information processing system 10 according to the second example embodiment of the present invention described above. The following explanation focuses on the characteristic portions of the present example embodiment. In the explanation, the configuration same as that of the above-explained example embodiments will not be explained by assigning the same reference numeral.

The plant monitoring system 20 according to the third example embodiment of the present invention is described with reference to FIG. 5 to FIG. 15.

Note that, for facilitating the explanation, the following takes an example in which the information processing system explained in each of the example embodiments is applied to a plant monitoring system that monitors a plant (not illustrated in the drawings). In that case, the plant monitoring apparatus 21 is assumed to be installed in a management center that manages the plant, for example. The field staff member to work in the plant (hereinafter simply referred to as "the field staff member") is assumed to carry the client 22.

FIG. 5 is a block diagram representing a configuration of a plant monitoring system 20 according to the third example embodiment of the present invention. In FIG. 5, the plant monitoring system 20 includes a plant monitoring apparatus 21 and a client 22

The plant monitoring apparatus 21 includes a judgment unit 13, an analyzing unit 23, an information control unit 24, a storage 25, a presentation unit 26, a transmission unit 27, and a receiving unit 28. The client 22 includes a presentation unit 4, a presentation control unit 14, an information generation unit 29, a transmission unit 30, and a receiving unit 31.

In the present example embodiment, the plant monitoring system 20 corresponds to the information processing system 10 explained in the second example embodiment. In addition, the plant monitoring apparatus 21 corresponds to the server apparatus 11 explained in the second example embodiment.

In the following explanation, for the convenience of explanation, it is assumed an abnormality is detected in a target apparatus being a target of interest. In addition, a manager of a management center is assumed to request a field staff member to handle the detected abnormality. The field staff member is assumed to handle the abnormality, in accordance with a handling request from the management center. In that case, the target information is assumed to represent an evidence of having handled the abnormality detected in relation to the target apparatus.

The analyzing unit 23 in the plant monitoring apparatus 21 analyzes an alarm issued upon detecting an abnormality in a target apparatus (target of interest), for example. In other words, the analyzing unit 23 analyzes information acquired from various types of sensors provided for the target apparatus. In addition, the analyzing unit 23 generates alarm information (alarm information A) that includes information representing an analysis result and information representing a postponement time acquired on the basis of the analysis result. The analyzing unit 23 outputs the generated alarm information A to the information control unit 24 in the plant monitoring apparatus 21.

The alarm information A is assumed to at least include the following information.

Information indicating the date and time (hereinafter referred to as the "occurrence date and time") at which an abnormality is detected in a target apparatus Information indicating a place at which an abnormality is detected Information indicating a type of a target apparatus (hereinafter referred to as "device type")

Postponement Time

Information indicating a type of an abnormality (hereinafter referred to as "abnormality type")

Information indicating a priority with which an abnormality is to be handled (hereinafter simply referred to as the "priority")

Information indicating a current situation related to an abnormality (hereinafter referred to as the "status")

A technique to analyze an alarm and acquire the postponement time on the basis of an analysis result can be performed by the analyzing unit 23 by way of currently common techniques. Therefore, the technique is not described in greater detail in the present example embodiment.

The information control unit 24 controls the presentation unit 26 to present presentation information to be presented to a manager that uses the apparatus (plant monitoring apparatus 21), in a mode recognizable by the manager, in accordance with a judgment result of the judgment unit 13. In addition, the information control unit 24 controls the storage 25 in the plant monitoring apparatus 21 to store various types of information.

The storage 25 stores at least alarm management information 111, staff management information 112, and handling information 113. For example, the storage 25 is a non-volatile storage device which data can be read from and written into by a computer.

The presentation unit 26 in the plant monitoring apparatus 21 has a function of presenting information to be presented to a manager, in a mode recognizable by the manager, in response to the control by the information control unit 24. To be more specific, for example, the presentation unit 26 may adopt an input/output interface such as an input device such as a touch panel and a display (e.g., an input/output interface 307 as illustrated in FIG. 16).

The information generation unit 29 of the client 22 has a function of generating target information related to a target apparatus.

To be more specific, for example, the information generation unit 29 may be an imaging device such as a camera that can capture image information or moving image information including the target apparatus. In that case, the date and time and the first position at which the target information is generated is assumed to be the date and time and the position at which the target apparatus is image-captured. In addition, depending on the specification of the imaging device, the imaging device has a function of assigning metadata representing the date and time and the position of the image-capturing, to the image information. For this reason, such a configuration may be adopted in which the assigned metadata can be used as the date and time and the first position. Alternatively, the information generation unit 29 may be a recording apparatus that can record sound or the like, for example. In that case, the date and time and the first position are assumed to indicate the date and time and the position at which the recording is performed. In addition, such a configuration may be adopted that, for the first position, information (the latitude, the longitude, and the altitude) measured using a global positioning system (GPS) or the like is used. Moreover, for the information generation unit 29, for example, various types of measuring apparatuses may be used, such as sound level meter, thermometer, smell sensor, pressures sensor, and temperature sensor.

However, the present invention explained by way of the present example embodiment is not limited to the configuration described above. For example, such a configuration may be adopted that the information representing the date and time and the first position as well as the first identification information are acquired from the target apparatus by communication means from among wireless communication such as beacon communication or contact communication, for example.

The transmission unit 27 in the plant monitoring apparatus 21 has a function of transmitting various types of information to the client 22 from the plant monitoring apparatus 21, between the plant monitoring apparatus 21 and the client 22. The receiving unit 28 in the plant monitoring apparatus 21 has a function of receiving the various types of information transmitted from the client 22.

The transmission unit 30 in the client 22 has a function of transmitting various types of information to the plant monitoring apparatus 21 from the client 22, between the plant monitoring apparatus 21 and the client 22. The receiving unit 31 in the client 22 has a function of receiving the various types of information transmitted from the plant monitoring apparatus 21.

A technique to transmit various types of information by the transmission units 27 and 30 and a technique to receive various types of information by the receiving units 28 and 31 can be performed by currently common techniques. Therefore, the technique is not described in greater detail in the present example embodiment.

The following is a more specific explanation of an operation of the plant monitoring system 20 according to the present example embodiment.

(Operation performed When an Abnormality is Detected in a Target Apparatus)

Figure 6:
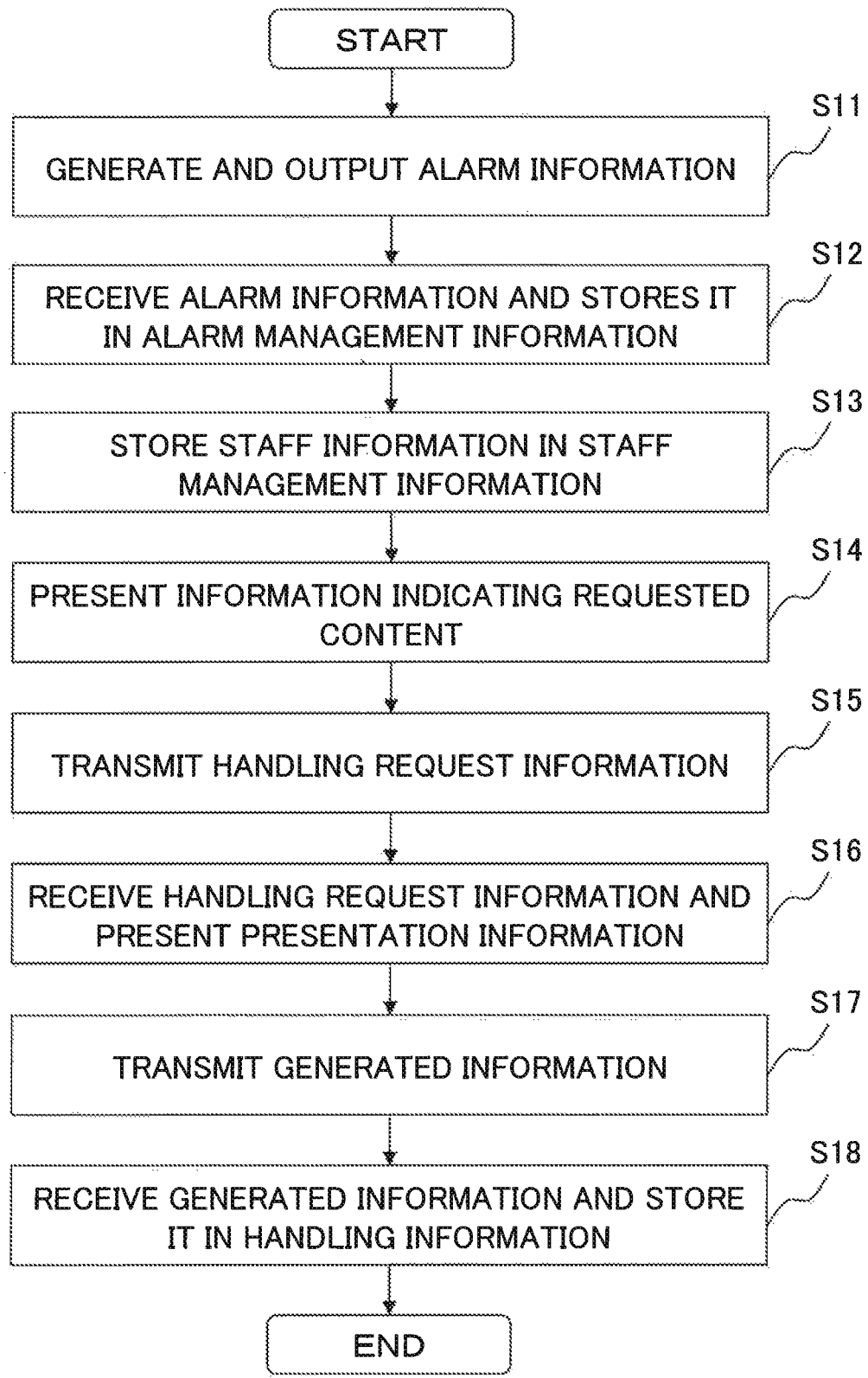
FIG. 6 is a flowchart representing operations starting from detection of an abnormality in a target apparatus performed by the plant monitoring system according to the third example embodiment to reporting of handling contents by a field staff member.

The following explains the operation starting from detection of an abnormality in a target apparatus until a field staff member reports handling contents, with reference to FIG. 6 to FIG. 8.

FIG. 6 is a flowchart representing operations starting from detection of an abnormality in a target apparatus performed by the plant monitoring system 20 according to the third example embodiment to reporting of handling contents by a field staff member. An operational procedure of the plant monitoring system 20 is explained with reference to the flowchart.

The analyzing unit 23 of the plant monitoring apparatus 21 analyzes the alarm issued upon detecting an abnormality in the target apparatus. In addition, the analyzing unit 23 generates alarm information A that includes information representing an analysis result and the postponement time acquired on the basis of the analysis result. The analyzing unit 23 outputs the generated alarm information A to the information control unit 24 of the plant monitoring apparatus 21 (Step S11).

The information control unit 24 receives the alarm information A from the analyzing unit 23. The information control unit 24 controls the storage 25 of the plant monitoring apparatus 21 to store the received alarm information A as the alarm management information 111 (Step S12).

The information control unit 24 controls the storage 25 to store information (staff information P) related to a field staff member that handles the detected abnormality, in the staff management information 112 (Step S13).

The staff information P is assumed to include at least the following information.

Information indicating a name of a field staff member

Information indicating a location of a field staff member

Information indicating a base which a field staff member is in charge of

Information indicating the skillset of a field staff member (e.g., a field of specialty of the field staff member or a technical field which the field staff member can handle)

Information indicating a technical level (technical rank) of a field staff member Information indicating an operation situation of a field staff member For example, when information in which a field staff member is associated with staff information P of the field staff member is registered in the plant monitoring apparatus 21 in advance, a manager is assumed to select a particular field staff member from among the registered field staff members in charge. In that case, the information control unit 24 may control the storage 25 to store, in the staff management information 112, the staff information P associated with the selected particular field staff member. Alternatively, the information control unit 24 may control the storage 25 to store the staff information P input by the manager, in the staff management information 112. However, the present invention explained by way of the present example embodiment is not limited to the configuration described above.

When requesting a field staff member to handle the abnormality, the information control unit 24 present, to the manager, the information indicating the content requested (handling request confirmation screen) by controlling the presentation unit 26 of the plant monitoring apparatus 21. In that case, the information control unit 24 is assumed to generate a handling request confirmation screen on the basis of the alarm information A and the staff information P (Step S14).

To be more specific, the following describes a display mode in the presentation unit 26, with reference to FIG. 7. FIG. 7 is a diagram specifically representing a display mode of a UI in the presentation unit 26 presenting information representing request content to a manager when requesting that a field staff member handle the detected abnormality (handling request confirmation screen).

For example, the presentation unit 26 displays a handling request confirmation screen in response to being controlled by the information control unit 24. That is, as an example of the display mode, the user interface provided by the presentation unit 26 is assumed to include at least the following, as illustrated in FIG. 7.

Information indicating priority (in M4 in FIG. 7, "high" indicating a high priority)

Information indicating a device type (in M4 in FIG. 7, "pipe")

Information indicating a status (in M4 in FIG. 7, "non-handling" indicating that the abnormality is not handled)

Information indicating a place at which an abnormality is detected (in M4 in FIG. 7, the place "District A")

Information indicating a name of a field staff member to handle (in M4 in FIG. 7, "Tom")

Display area of information related to an alarm (abnormality) (A1 in FIG. 7)

A means that operates a means that notifies a field staff member of content requested to be handled (e.g., the information control unit 24 and the transmission unit 27) in accordance with a manager's operation (handling request button for "Request handling" illustrated in B3 in FIG. 7).

In this case, in the display area illustrated in A1 in FIG. 7, for example, information related to the analysis result of the analyzing unit 23 may be displayed (e.g., graph).

However, the present invention explained by way of the present example embodiment is not limited to the configuration described above. Various types of information included in a user interface provided by the presentation unit 26 may also have such a configuration of being provided as a sound message, not only being displayed on the presentation unit 26, for example (This explanation also applies to various types of information to be included in the user interface, which are explained below).

By confirming the handling request confirmation screen illustrated in FIG. 7, a manager can easily recognize information such as a field staff member from whom the handling is requested and a priority with respect to an abnormality. In addition, when requesting handling from the field staff member, the manager can instruct the field staff member to handle the abnormality, by simply operating the handling request button (B3 illustrated in FIG. 7).

In the following explanation, for the convenience of explanation, a manager is assumed to press the handling request button (B3 illustrated in FIG. 7).

In accordance with a manager's operation, the information control unit 24 generates handling request information (handling request information R) on the basis of alarm information A and staff information P. In addition, the information control unit 24 transmits the handling request information R to the client 22 via the transmission unit 27 of the plant monitoring apparatus 21 (Step S15).

The handling request information R is assumed to include at least information requesting handling a detected abnormality, information indicating a priority, information indicating a device type, information indicating a status, and information indicating a place at which an abnormality is detected, for example.

The presentation control unit 14 of the client 22 receives the handling request information R transmitted from the information control unit 24, via the receiving unit 31 of the client 22. The presentation control unit 14 presents, to a field staff member, presentation information (handling request notice screen) indicating the request content notified by the manager on the basis of the handling request information R, by controlling the presentation unit 4 (Step S16).

The following explains a display mode in the presentation unit 4, with reference to FIG. 8. FIG. 8 is a diagram specifically representing a display mode of a UI in the presentation unit 4 presenting presentation information representing request content to a field staff member when a manager requested that the field staff member handle the detected abnormality (handling request notice screen).

For example, in response to being controlled by the presentation control unit 14, the presentation unit 4 displays a handling request notice screen. That is, as an example of the display mode, a user interface provided by the presentation unit 4 is assumed to include at least the following, as illustrated in FIG. 8. Note that among the information illustrated in M6 in FIG. 8, other information than the information indicating the required time estimate is the same as the information indicated in M4 in FIG. 7. Therefore, the overlapping explanation is omitted in the following.

Information to request handing of a detected abnormality ("Please handle." in M5 in FIG. 8)

Information instructing submission of target information (in M5 in FIG. 8, "When you have completed the handling, please describe the handling contents in the handling report column, and generate target information. Please report the handling at the time of submission of the target information."), Information indicating an estimated required time for a field staff member to move to a place at which an abnormality is detected (the required time estimate of "10 minutes" in M6 in FIG. 8)

Map information indicating a positional relation between the place at which the abnormality is detected (A2-1 illustrated in FIG. 8) and the place at which the field staff member is positioned (A2-2 in FIG. 8) (A2 illustrated in FIG. 8)

A handling report area in which handling contents can be described (For example, text input window, A3 illustrated in FIG. 8)

A means that operates the information generation unit 29 of the client 22 in accordance with an operation of a field staff member (the generation button illustrated in B1 in FIG. 8)

A means that operates a submitting means that can submit generated information 103 in accordance with an operation of a field staff member (the handling report button in B4 in FIG. 8)

In this case, the generated information 103 is assumed to include information indicating handling contents input in a handling report area (A3 illustrated in FIG. 8), first identification information, target information, and information indicating the date and time and a first position at which the target information is generated.

By confirming the handling request notice screen, the field staff member can easily recognize what to do next. In addition, when generating target information, the field staff member can operate the information generation unit 29 by simply operating the generation button (B1 illustrated in FIG. 8). The field staff member can submit the generated information 103 that includes the target information generated by the information generation unit 29, to the plant monitoring apparatus 21, by simply operating the handling report button (B4 illustrated in FIG. 8). Consequently, the convenience of the field staff member improves.

In the following explanation, for the convenience of explanation, the field staff member is assumed to operate the generation button (B1 illustrated in FIG. 8) at the time when the handling of the abnormality is complete. The field staff member is assumed to generate target information by the information generation unit 29 operating in response to the generation button being operated. In addition, the client 22 is assumed to acquire first identification information that can identify the handling target from the handling target (target apparatus), the abnormality of which has been handled, by any communication means from among wireless communication and contact communication. The field staff member is assumed to operate the handling report button (B4 illustrated in FIG. 8), and submit the generated information 103 to the plant monitoring apparatus 21. Note that the client 22 may acquire, from that handling target, the information indicating the date and time and the first position as well as the first identification information by means of any communication means from among wireless communication and contact communication.

In response to operation of the handling report button by the field staff member, the presentation control unit 14 generates the generated information 103. The presentation control unit 14 transmits the generated information 103 having been generated, to the plant monitoring apparatus 21 via the transmission unit 30 of the client 22 (Step S17).

The information control unit 24 receives the generated information 103 from the presentation control unit 14 via the receiving unit 28 of the plant monitoring apparatus 21. The information control unit 24 controls the storage 25 to store the generated information 103 having been received, in the handling information 113 (Step S18).

In this case, the handling information 113 is assumed to include information in which associated are information indicating the handling contents; target information; information indicating the date and time and the first position at which the target information is generated; and the first identification information.

(Regarding the Truth Judgment of the Target Information)

The following explains, with reference to FIG. 9 to FIG. 15, a truth judgment operation on target information submitted from a field staff member performed through processing from Step S11 to Step S18 in FIG. 6.

FIG. 9A and FIG. 9B are flowcharts representing a truth judgment operation on target information performed by the plant monitoring system 20 according to the third example embodiment of the present invention. An operational procedure of the plant monitoring system 20 is explained with reference to the flowcharts. In the following explanation, FIG. 9A and FIG. 9B are collectively and simply referred to as "FIG. 9" for the convenience of explanation.

Note that the processing indicated in Steps S17 and S18 in FIG. 9 is the same as the processing explained as Steps S17 and S18 in FIG. 6. Therefore, the overlapping explanation is omitted in the following.

In the following explanation, the judgment unit 13 of the plant monitoring apparatus 21 performs truth judgment on target information included in the generated information 103 on the basis of alarm information A and the generated information 103 stored in the storage 25. That is, the judgment unit 13 performs truth judgment on the target information on the basis of the alarm information A stored in the alarm management information 111 and the generated information 103 stored in the handling information 113. In that case, the judgment unit 13 requests the alarm information A and the generated information 103 from the information control unit 24. In response to that request, the information control unit 24 is assumed to output, to the judgment unit 13, the alarm information A extracted from the alarm management information 111 and the generated information 103 extracted from the handling information 113, for example.

In Step S21, the judgment unit 13 judges whether or not the date and time included in the generated information 103 is included in the period starting from the time to start generation of the target information to when the time allowed to be taken before generation of the target information ("postponement time") has passed. In other words, the judgment unit 13 judges whether or not the date and time at which the target information is generated is included in the period starting from the time when a phenomenon is detected related to the target of interest to when the time allowed to be taken before the phenomenon is handled ("postponement time") has passed. In this case, the time when a phenomenon is detected related to the target of interest indicates the occurrence date and time included in the alarm information A. In addition, the postponement time indicates the postponement time included in the alarm information A. Thus, Step S21 can be expressed by the following expression (1).

$$(\text{the occurrence date and time}) \leq (\text{the date and time at which the target information is generated}) \leq (\text{the occurrence date and time} + \text{postponement time}) \quad (1)$$

As a result of the judgment, when judging that the date and time is included in that period, the judgment unit 13 proceeds the processing to Step S22 ("YES" in Step S21). On the contrary, when judging that the date and time is not included in that period, the judgment unit 13 proceeds the processing to Step S31 ("NO" in Step S21).

In Step S22, the judgment unit 13 judges whether or not the first position included in the generated information 103 satisfies the criteria of including the second position indicating the location of the target apparatus. In other words, the judgment unit 13 judges whether or not the first position at which the target information is generated satisfies the criteria.

As a result of the judgment, when judging that the first position satisfies the criteria, the judgment unit 13 proceeds the processing to Step S23 ("YES" in Step S22). On the contrary, when judging that the first position does not satisfy the criteria, the judgment unit 13 proceeds the processing to Step S31 ("NO" in Step S22).

The following more specifically explains the judgment approach to judge whether or not the first position satisfies the criteria.

In the following explanation, the first position and the second position are assumed to include information representing at least the latitude and the longitude. Alternatively, the first position and the second position may also adopt information representing the altitude, not only the information representing the latitude and the longitude.

In the first judgment approach, the judgment unit 13 judges whether or not the first position matches the second position, or the first position is included in a predetermined range that includes the second position, for example. The judgment unit 13 may adopt such a configuration to judge that the criteria is satisfied when judging that the first position is either matches the second position or is included in the predetermined range.

In the second judgment approach, the judgment unit 13 may adopt such a configuration to judge that the criteria is satisfied when judging that the distance between the first position and the second position is within a first reference (threshold), for example.

As the third judgment approach, the following approach may be adopted. For example, when information indicating that the first position and the second position are further oriented to a direction in which the target apparatus (target of interest) is oriented, the judgment unit 13 may adopt such a configuration to judge that the criteria is satisfied when the first position and the second position are oriented in the same direction as each other.

In the fourth judgment approach, when the target information is image information that includes at least a target apparatus, and when including information indicating that the first position and the second position are further in an imaging direction in which the target apparatus is image-captured, the judgment unit 13 may adopt the following judgment approach. That is, the judgment unit 13 may adopt such a configuration to judge that the criteria is satisfied when the first position and the second position are oriented in the same imaging direction as each other.

Accordingly, for example when the image information does not include the target apparatus even when the image information is generated in a place where the first position matches the second position, the judgment unit 13 can judge that the image information is non-true. That is, even when the image information is captured so as not to include the target apparatus (in a direction different from the imaging direction in which imaging should be performed) in the place where the first position matches the second position, the judgment unit 13 can still judge that that image information is non-true.

Note that in the above-described example embodiment, for the convenience of explanation, the judgment unit 13 is explained to have a configuration to perform each judgment approach, as an example. However, the example embodiments of the present invention are not limited to the configuration described above. The judgment unit 13 may perform at least one of the four judgment approaches described above.

The above-described present example embodiment, for the convenience of explanation, was explained to have an exemplary configuration in which the first position and the second position include information representing at least the latitude and the longitude. However, the example embodiments of the present invention are not limited to the configuration described above. For the first position and the second position, a configuration to include a position in a certain place at which the target information should be generated may be adopted. Alternatively, such a configuration may be adopted in which the second position includes information indicating a certain area forming a plane. In that case, the judgment unit 13 may adopt a configuration to judge that the criteria is satisfied when judging that a distance between the first position and an end of the plane abutting against the first position is within a second reference (threshold).

From the above, for example when a certain place at which the target information should be generated coincides with a front plane, a back plane, or a side plane (a lateral plane), the judgment unit 13 can still judge whether or not the first position satisfies the criteria. In addition, for example even when the certain place coincides with an access hole provided for the target apparatus, the judgment unit 13 can still judge whether or not the first position satisfies the criteria. Alternatively, even when the certain place is a certain position in a building, the judgment unit 13 can still judge whether or not the first position satisfies the criteria. In this case, a certain position in a building is assumed to be, for example, information that represents on top of a tower or information that represents on top of a tower and that includes a direction from on top of the tower towards where the target apparatus is positioned.

In Step S23, the judgment unit 13 judges whether or not first identification information included in the generated information 103 matches second identification information defined in advance for the target apparatus. In other words, the judgment unit 13 judges whether or not first identification information that can identify a handling target having handled a phenomenon detected in relation to the target apparatus and is obtained from the handling target matches the second identification information defined in advance for the target apparatus.

As a result of the judgment, when judging that the first identification information matches the second identification information, the judgment unit 13 proceeds the processing to Step S24 ("YES" in Step S23). On the contrary, when judging that the first identification information does not match the second identification information, the judgment unit 13 proceeds the processing to Step S31 ("NO" in Step S23).

In Step S24, the judgment unit 13 outputs the judgment result indicating that the target information is true, to the information control unit 24.

The information control unit 24 receives the judgment result from the judgment unit 13. The information control unit 24 presents, to a manager, information (first handling report screen) to be presented to the manager, by controlling the presentation unit 26. For example, the information to be presented is assumed to at least include a judgment result, information related to the judgment result, information related to handling contents reported by a field staff member, and information related to alarming. In that case, the information control unit 24 is assumed to generate the first handling report screen on the basis of the judgment result, and the alarm information A, the staff information P, and the generated information 103, which are stored in the storage 25 (Step S25).

To be more specific, the following describes a display mode in the presentation unit 26, with reference to FIG. 10. FIG. 10 is a diagram specifically representing a display mode of a UI, when a judgment result indicates that target information is true, in the presentation unit 26 presenting, to a manager, information including the judgment result and handling contents reported by a field staff member (first handling report screen).

For example, the presentation unit 26 displays the first handling report screen, in response to being controlled by the information control unit 24. That is, as illustrated in FIG. 10, a user interface provided by the presentation unit 26 is assumed to include at least the following, as an example of display mode. Note that among the information included in M8 in FIG. 10, those other than the information indicating a status are the same as the information included in M4 in FIG. 7. In addition, A1 illustrated in FIG. 10 is the same as A1 explained in FIG. 7. Therefore, the overlapping explanation is omitted in the following.

Information indicating a judgment result (In M7 in FIG. 10, "A handling report has been registered. The result of the truth judgment on the target information was "true".)

Information indicating a status (In M8 in FIG. 10, "waiting for confirmation" indicating waiting state for the manager's confirmation of the handling report)

Area to display information related to handling contents reported by the field staff member (A4 illustrated in FIG. 10)

Area to display information related to the judgment result (A5 illustrated in FIG. 10)

A means that operates a means that, in response to a manager's operation, notifies handling completion when the manager judges completion of the handling directed to the detected abnormality (PASS button illustrated in B5 in FIG. 10)

A means that operates a means that, in response to a manager's operation, notifies incompletion of the handling when the manager judges not yet to complete the handling directed to the detected abnormality (FAIL button illustrated in B6)

To be more specific, the following describes A4 and A5 illustrated in FIG. 10. The area illustrated in A4 in FIG. 10 is assumed to display the handling contents input by a field staff member in the handling report area illustrated in A3 in FIG. 8, for example. In addition, the area illustrated in A5 in FIG. 10 is assumed to display the result of the judgment in each of Step S21, Step S22, and Step S23 in FIG. 9, for example. However, the present invention explained by way of the present example embodiment is not limited to the configuration described above.

In the following explanation, a manager is assumed to judge whether or not to complete handling on a phenomenon in relation to the target apparatus on the basis of information provided by the presentation unit 26, for example. The manager is assumed to press the PASS button illustrated in B5 in FIG. 10 when judging to complete the handling. On the contrary, when judging not to complete the handling, the manager is assumed to press the FAIL button illustrated in B6 in FIG. 10.

In Step S26, the information control unit 24 judges whether or not to complete handling on the phenomenon in relation to the target apparatus. In other words, the information control unit 24 judges whether or not to complete the handling, in accordance with a manager's operation, for example.

As a result of the judgment, when judging to complete the handling, the information control unit 24 proceeds the processing to Step S27 ("YES" in Step S26). On the contrary, when judging not to complete the handling, the information control unit 24 proceeds the processing to Step S29 ("NO" in Step S26)

To be more specific, the information control unit 24 judges to complete the handling when the manager has pressed the PASS button illustrated in B5 in FIG. 10, for example. In addition, the information control unit 24 judges not to complete the handling when the manager has pressed the FAIL button illustrated in B6 in FIG. 10.

When judging to complete the handling ("YES" in Step S26), the information control unit 24 controls the storage 25 to store, in the alarm management information 111, handling completion information indicating to complete the handling in a state associated with the alarm information A. The information control unit 24 notifies the presentation control unit 14 of the handling completion. That is, the information control unit 24 transmits the handling completion information to the presentation control unit 14 via the transmission unit 27. The information control unit 24 proceeds the processing to Step S28 (Step S27).

The presentation control unit 14 receives the notice from the information control unit 24 via the receiving unit 31. That is, the presentation control unit 14 receives the handling completion information from the information control unit 24. The presentation control unit 14 presents, to the field staff member, the presentation information to be presented to the field staff member on the basis of the notice, by controlling the presentation unit 4 (Step S28).

In this case, the presentation information is assumed to include at least information indicating to complete the handling.

Figure 11:
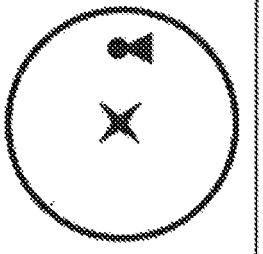
FIG. 11 is a diagram specifically representing a display mode of a UI, when notified that handling of a detected abnormality is complete, in the presentation unit presenting presentation information indicating the notice content to a field staff member (handling completion notice screen).

To be more specific, the following describes a display mode in the presentation unit 4, with reference to FIG. 11. FIG. 11 is a diagram specifically representing a display mode of a UI, when notified that handling of a detected abnormality is complete, in the presentation unit 4 presenting presentation information indicating the notice content to a field staff member (handling completion notice screen).

For example, the presentation unit 4 presents the handling completion notice screen, in response to being controlled by the presentation control unit 14. That is, as an example of the display mode, the user interface provided by the presentation unit 4 is assumed to include at least the following, as illustrated in FIG. 11. Note that in the following explanation, A2 and A3 illustrated in FIG. 11 are the same as A2 and A3 explained in FIG. 8. In addition, among the information illustrated in M10 in FIG. 11, those other than the information indicating a status are the same as the information included in M6 in FIG. 8. Therefore, the overlapping explanation is omitted in the following.

Information indicating completion of handling on an abnormality detected in relation to a target apparatus ("Handling is complete." in M9 in FIG. 11)

Information indicating a status ("handling completion" indicating completion of handling, in M10 in FIG. 11)

Note that in FIG. 11, the presentation unit 4 may adopt such a configuration to display in a mode in which the generation button illustrated in B1 and the handling report button illustrated in B4 in FIG. 8 are rendered to be "non-display", or cannot be operated.

When judging not to complete the handling ("NO" in Step S26), the information control unit 24 executes the following processing. That is, the information control unit 24 controls the storage 25 to store, in the alarm management information 111, handling incompletion information indicating not to complete the handling (i.e., the handling is incomplete) in a state associated with the alarm information A. The information control unit 24 notifies the presentation control unit 14 that the handling is incomplete. That is, the information control unit 24 transmits the handling incompletion information to the presentation control unit 14 via the transmission unit 27. The information control unit 24 proceeds the processing to Step S30 (Step S29).

The presentation control unit 14 receives the notice from the information control unit 24 via the receiving unit 31. That is, the presentation control unit 14 receives the handling incompletion information from the information control unit 24. The presentation control unit 14 presents, to the field staff member, the presentation information to be presented to the field staff member on the basis of the notice, by controlling the presentation unit 4 (Step S30).

In this case, the presentation information is assumed to include at least information indicating that the handling is incomplete.

In Step S31, the judgment unit 13 executes the following processing. That is, the judgment unit 13 judges whether or not the current date and time is included in the period starting from the time when the abnormality is detected in relation to the target apparatus to when the postponement time has passed. In other words, the judgment unit 13 judges whether or not it is in the period during which new target information can be generated.

As a result of the judgment, when judging that the current date and time is included in that period, the judgment unit 13 proceeds the processing to Step S32 ("YES" in Step S31). On the contrary, when judging that the current date and time is not included in that period, the judgment unit 13 proceeds the processing to Step S38 ("NO in Step S31).

When judging that the current date and time is included in that period ("YES" in Step S31), the judgment unit 13 outputs information indicating the judgment result to the information control unit 24. That is, the judgment unit 13 outputs, to the information control unit 24, the judgment result indicating that the target information is non-true and the judgment result indicating that the current date and time is included in that period. In other words, the judgment unit 13 outputs, to the information control unit 24, the judgment result indicating that the target information is non-true and the judgment result indicating that new target information can be generated (Step S32).

The information control unit 24 receives the information indicating the judgment result from the judgment unit 13. The information control unit 24 controls the storage 25 to store, in the alarm management information 111, the information indicating the judgment result in a state associated with the alarm information A. In other words, the information control unit 24 controls the storage 25 to store, in the alarm management information 111, the information indicating that the target information is non-true and that new target information can be generated, in a state associated with the alarm information A (Step S33).

The information control unit 24 presents, to the manager, the information to be presented to the manager (second handling report screen), by controlling the presentation unit 26. For example, the information to be presented is assumed to at least include the judgment result, information related to the judgment result, information related to handling contents reported by the field staff member, and information related to alarming (Step S34).

To be more specific, the following describes a display mode in the presentation unit 26, with reference to FIG. 12. FIG. 12 is a diagram specifically representing a display mode of a UI, when the judgment result indicates that the target information is non-true and it is possible to submit new target information, in the presentation unit 26 presenting, to a manager, information including the judgment result and the handling contents reported by the field staff member (second handling report screen).

For example, the presentation unit 26 displays the second handling report screen, in response to being controlled by the information control unit 24. That is, as illustrated in FIG. 12, the user interface provided by the presentation unit 26 is assumed to include at least the following, as an example of a display mode. Note that in the following explanation, A1, A4, and A5 illustrated in FIG. 12 are the same as A1, A4, and A5 explained in FIG. 10. In addition, among the information included in M12 in FIG. 12, those other than the information indicating a status are the same as the information included in M8 in FIG. 10. Therefore, the overlapping explanation is omitted in the following.

Information indicating a judgment result (In M11 in FIG. 12, "A handling report has been registered. The result of the truth judgment on the target information was "non-true".)

Information indicating a judgment result indicating that new target information can be generated (In M11 in FIG. 12, "Since it is within the period, it is possible to re-submit target information.")

Information indicating a status (In M12 in FIG. 12, "judgment result being non-true, and re-submission being possible") indicating the judgment result)

A means that operates a means that, in response to a manager's operation, notifies a field staff member to submit new target information (the instruction button to "instruct re-submission of target information" illustrated in B7 in FIG. 12)

Note that in FIG. 12, the presentation unit 26 may adopt such a configuration to display in a mode in which the PASS button illustrated in B5 in FIG. 10 and the FAIL button illustrated in B6 in FIG. 10 are rendered non-display, or cannot be operated.

By confirming the second handling report screen, the manager can confirm the truth judgment result and recognize that it is possible to submit new target information, for example. In addition, when instructing submission of new target information to the field staff member, the manager can instruct the field staff member to submit the new target information, by simply operating the instruction button (B7 illustrated in FIG. 12).

In the following explanation, for the convenience of explanation, the manager is assumed to press an instruction button (B7 illustrated in FIG. 12).

For example, the information control unit 24 outputs, to the judgment unit 13, information indicating that the instruction button has been operated, in response to the manager's operation (Step S35).

The judgment unit 13 notifies the presentation control unit 14 of request (instruction) of submission of the judgment result in Steps S21 to S23 illustrated in FIG. 9 and new target information. That is, the judgment unit 13 transmits the information indicating the judgment result and the request information requesting submission of new target information to the presentation control unit 14 via the transmission unit 27 (Step S36).

The presentation control unit 14 receives the notice from the judgment unit 13 via the receiving unit 31. The presentation control unit 14 presents, to the field staff member, the presentation information instructing submission of at least new target information on the basis of the notice, by controlling the presentation unit 4 (Step S37).

To be more specific, the following describes a display mode in the presentation unit 4, with reference to FIG. 13. FIG. 13 is a diagram specifically representing a display mode of a UI, when the judgment result indicates that the target information is non-true and it is possible to submit new target information, in the presentation unit 4 presenting relevant presentation information to a user (re-submission instruction information).

For example, the presentation unit 4 displays a re-submission instruction notice screen, in response to being controlled by the presentation control unit 14. That is, as an example of a display mode, the user interface provided by the presentation unit 4 is assumed to include at least the following, as illustrated in FIG. 13. Note that in the following explanation, A2 and A3 illustrated in FIG. 13 are the same as A2 and A3 explained in FIG. 8. In addition, among the information illustrated in M14 in FIG. 13, those other than the information indicating a status are the same as the information included in M6 in FIG. 8. In addition, B1 and B4 illustrated in FIG. 13 are the same as B1 and B4 explained in FIG. 8. Therefore, the overlapping explanation is omitted in the following.

Information indicating a judgment result (In M13 in FIG. 13, "A handling report has been registered. The result of the truth judgment on the target information was "non-true".)

Presentation information instructing submission of new target information (In M13 in FIG. 13, "Please generate target information again, and report the handling.")

Information indicating a status (in M14 in FIG. 13, "judgment result being non-true" indicating the judgment result)

By confirming the re-submission instruction notice screen, the field staff member is reminded that generation of target information is necessary. That is, the field staff member can easily recognize the action to take next.

Note that in the present example embodiment described above, for the convenience of explanation, the presentation information instructing submission of new target information adopts a configuration using such expression "Please generate target information again, and report the handling" as an example, as illustrated in M13 in FIG. 13. However, the example embodiments of the present invention are not limited to the configuration described above. The presentation information may for example adopt a configuration using such expression "Please capture an image of a target apparatus, and report the handling". In that case, it is possible to construct in such a way that an application for image capturing starts operating by means of an imaging device such as a camera, in response to the generation button (B1 in FIG. 13) being pressed.

When the current date and time is judged not to be included in that period ("NO" in Step S31), the judgment unit 13 outputs information indicating the judgment result to the information control unit 24. That is, the judgment unit 13 outputs, to the information control unit 24, the judgment result indicating that the target information non-true and the judgment result indicating that the current date and time is not included in that period. In other words, the judgment unit 13 outputs, to the information control unit 24, the judgment result indicating that the target information is non-true and the judgment result indicating that new target information cannot be generated (Step S38).

The information control unit 24 receives the information indicating the judgment result from the judgment unit 13. The information control unit 24 controls the storage 25 to store, in the alarm management information 111, the information indicating the judgment result in a state associated with the alarm information A. In other words, the information control unit 24 controls the storage 25 to store, in the alarm management information 111, the information indicating that the target information is non-true and that new target information cannot be generated, in a state associated with the alarm information A (Step S39).

The information control unit 24 presents, to a manager, the information to be presented to the manager (third handling report screen), by controlling the presentation unit 26. For example, the information to be presented is assumed to at least include the judgment result, information related to the judgment result, information related to handling contents reported by the field staff member, and information related to alarming (Step S40).

To be more specific, the following describes the display mode in the presentation unit 26, with reference to FIG. 14. FIG. 14 is a diagram specifically representing a display mode of a UI, when the judgment result indicates that the target information is non-true and it is impossible to submit new target information, in the presentation unit 26 presenting, to a manager, information including the judgment result and the handling contents reported by a field staff member (third handling report screen).

For example, the presentation unit 26 displays the third handling report screen, in response to being controlled by the information control unit 24. That is, as illustrated in FIG. 14, the user interface provided by the presentation unit 26 is assumed to include at least the following, as an example of a display mode. Note that in the following explanation, A1, A4, and A5 illustrated in FIG. 14 are the same as A1, A4, and A5 explained in FIG. 10. In addition, among the information included in M16 in FIG. 14, those other than the information indicating a status are the same as the information included in M8 in FIG. 10. Therefore, the overlapping explanation is omitted in the following.

Information indicating a judgment result (In M15 in FIG. 14, "A handling report has been registered. The result of the truth judgment on the target information was "non-true".), Information indicating a judgment result indicating that new target information cannot be generated (In M15 in FIG. 14, "It is impossible to re-submit target information.")

Information indicating a status (In M16 in FIG. 14, "judgment result being non-true, and re-submission being impossible" indicating the judgment result)

A means that operates a means that, in response to a manager's operation, notifies incompletion of the handling when the manager judges not yet to complete the handling directed to the detected abnormality (FAIL button illustrated in B6 in FIG. 14)

Note that in FIG. 14, the presentation unit 26 may adopt such a configuration to display in a mode in which the PASS button illustrated in B5 in FIG. 10 is rendered non-display, or cannot be operated.

By confirming the third handling report screen, the manager can recognize various types of information including the truth judgment result, for example.

In the following explanation, for the convenience of explanation, a manager is assumed to press the FAIL button exemplified as B6 illustrated in FIG. 14, when a manager has confirmed the information displayed in the third handling report screen.

In response to a manager's operation, the information control unit 24 controls the storage 25 to store, in the alarm management information 111, handling incompletion information indicating not to complete the handling (i.e., the handling is incomplete) in a state associated with the alarm information A. The information control unit 24 notifies the presentation control unit 14 that the handling is incomplete. That is, the information control unit 24 transmits the handling incompletion information to the presentation control unit 14 via the transmission unit 27 (Step S41).

The presentation control unit 14 receives the notice from the information control unit 24 via the receiving unit 31. That is, the presentation control unit 14 receives the handling incompletion information from the information control unit 24. The presentation control unit 14 presents, to the field staff member, the presentation information to be presented to the field staff member on the basis of the notice, by controlling the presentation unit 4 (Step S42).

Figure 15:
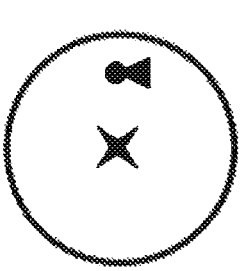
FIG. 15 is a diagram specifically representing a display mode of a UI, when notified that the handling of the detected abnormality is incomplete, in the presentation unit presenting presentation information indicating the notice content to a field staff member (handling incompletion notice screen).

To be more specific, the following describes a display mode in the presentation unit 4, with reference to FIG. 15. FIG. 15 is a diagram specifically representing a display mode of a UI, when notified that the handling of the detected abnormality is incomplete, in the presentation unit 4 presenting presentation information indicating the notice content to the field staff member (handling incompletion notice screen).

For example, the presentation unit 4 displays the handling incompletion notice screen in response to being controlled by the presentation control unit 14. That is, as illustrated in FIG. 15, the user interface provided by the presentation unit 4 is assumed to include at least the following, as an example of a display mode. Note that in the following explanation, A2 and A3 illustrated in FIG. 15 are the same as A2 and A3 explained in FIG. 8. In addition, among the information illustrated in M18 in FIG. 15, those other than the information indicating a status are the same as the information included in M6 in FIG. 8. Therefore, the overlapping explanation is omitted in the following.

Information indicating that handling of the abnormality detected in relation to the target apparatus is incomplete ("Handling is incomplete." in M17 in FIG. 15)

Information indicating a status (in M18 in FIG. 15, "handling incompletion" indicating that the handling is incomplete)

Note that in FIG. 15, the presentation unit 4 may adopt such a configuration to display in a mode in which the generation button illustrated in B1 and the handling report button illustrated in B4 in FIG. 8 are rendered non-display, or cannot be operated.

Note that in the present example embodiment described above, for the convenience of explanation, the judgment unit 13 adopts a configuration to perform truth judgment on the target information using the date and time, the position, and the identification information, as an example. However, the example embodiments of the present invention are not limited to the configuration described above. For example, when the target information is image information, the judgment unit 13 may have such a configuration to perform truth judgment on the target information by also using the feature amount of the image information. In that case, the judgment unit 13 may judge that the target information is true when the acquired feature amount is equal to or larger than a predetermined reference. In addition, for example, the judgment unit 13 may judge that the target information is true when the image information being the target information is the similar to or substantially similar to the image information being the reference. For example, in the following explanation, the target apparatus is assumed to be marked (for example, a red circle is drawn for the target apparatus so that the marker is situated at the four corner of the image frame). Under that assumption, the judgment unit 13 may judge that the target information is true when image information including the target apparatus having captured by a camera includes the marker.

As described above, the plant monitoring system 20 according to the present example embodiment can achieve the effect explained in each example embodiment. In addition, even when target information related to a target of interest is disguised, the plant monitoring system 20 according to the present example embodiment can detect the disguise with more accuracy, and provide appropriate information to be provided for a user, in accordance with the detection result, for the following reasons.

The reason is that the judgment unit 13 can perform truth judgment on target information using various judgment approaches. Therefore, even when for example a field staff member submits target information which disguises handling even though in reality he or she did not handle the abnormality, the judgment unit 13 can detect the disguise with more accuracy. In other words, the judgment unit 13 can judge whether or not the handling has been performed as instructed by the manager, by performing truth judgment on the target information. As a result, the plant monitoring system 20 can alleviate the loss generated when the target information is disguised by a field staff member failing to handle the abnormality.

Another reason is that the information control unit 24 can present, to a manager, information to be presented to the manager, by controlling the presentation unit 26, depending on the status of the plant. In addition, the presentation control unit 14 can present, to a field staff member, presentation information to be presented to the field staff member, by controlling the presentation unit 4. That is, the plant monitoring system 20 can present, to either a manager or a field staff member, information that is optimal to the manager or the field staff member.

(Exemplary Hardware Configuration)

In the above-explained example embodiment, among the units illustrated in the drawings (FIG. 1, FIG. 3, and FIG. 5), at least the judgment unit, the presentation control unit, the analyzing unit, and the information control unit can be considered as functional units (processing unit, software module) of a software program. These software modules may be realized by dedicated hardware. However, the units illustrated in these drawings are grouped as in this way for the convenience of explanation; and therefore, in reality, various other configurations may be conceived of. An exemplary hardware environment in this case is explained with reference to FIG. 16.

FIG. 16 is a diagram exemplifying a configuration of an information processing apparatus (computer) 300 that can realize at least a function such as a judgment unit, in the information processing system and the plant monitoring system in an exemplary example embodiment according to the present invention. That is, FIG. 16 illustrates a configuration of a computer (information processing apparatus), which is a hardware environment in which each function can be realized in the above-described example embodiment. This computer can realize either a whole or a part of the functions of the information processing system 1 (FIG. 1), the information processing system 10(FIG. 3), or the plant monitoring system 20 (FIG. 5)

The information processing apparatus 300 illustrated in FIG. 16 is a general computer in which the following configurations are connected via a bus (communication line) 306.

Central processing unit (CPU) 301
Read only memory (ROM) 302
Random access memory (RAM) 303
Hard disk (storage apparatus) 304
Communication interface 305 (illustrated as "communication interface (I/F)" in FIG. 16) in relation to an external apparatus
Input/output interface (I/F) 307 such as an input device such as a touch panel and a display The present invention explained by way of the above-described example embodiments is realized by the following procedure. That is, the information processing apparatus 300 illustrated in FIG. 16 is provided with a computer program that can realize the function in the block configuration diagrams (FIG. 1, FIG. 3, and FIG. 5) or the flowcharts (FIG. 4, FIG. 9A and FIG. 9B) referenced in these example embodiments. Thereafter, that computer program is realized by being executed by being read onto the CPU 301 of the hardware. The computer program supplied in the apparatus can be stored in a non-volatile storage device such as a temporary storage memory (RAM 303) or a hard disk 304 to which reading and writing of data is possible.

In the above-described case, any currently common procedure can be adopted as a method of providing the hardware with a computer program. Exemplary providing methods include a method to install the computer program in the apparatus by way of various types of recording media such as a CD-ROM, and a method to download the computer program from outside via a communication line such as the Internet. In that case, the present invention can be understood as being configured by a code configuring the computer program or a recording medium storing therein the code.

So far, the present invention has been explained by way of the example embodiments. However, the present invention is not limited to the above-explained example embodiments. The configuration of the present invention can be changed in various manners which can be conceived of by those skilled in the art within the scope of the present invention.

Note that a part or all of the example embodiments described above can also be expressed as in the following Supplementary notes; however, the present invention exemplified in the above example embodiments is not limited to the following Supplementary notes.

Supplementary Note 1

An information processing system including a server apparatus and a client communicably coupled to the server apparatus via a communication network, wherein
- the server apparatus judges whether or not target information related to a target of interest is true, based at least on information representing a date and time and a first position at which the target information is generated and based on a judgment condition for judging whether the target information is true or not, and the server apparatus provides a judgment result to the client when the target information is judged to be non-true, and
- the client controls presentation means to present presentation information to a user who uses the client, in a mode recognizable by the user, in accordance with the judgment result in the server apparatus, and presents, to the user by controlling the presentation means, the presentation information instructing at least submission of new target information in accordance with the judgment result indicating non-true.

Supplementary Note 2

The information processing system according to Supplementary note 1, wherein
in providing the client with the judgment result, the server apparatus judges whether or not a current date and time is included in a period starting from a time to start generation of the target information to when a time allowed to be taken before generation of the target information has passed, and when having judged that the current date and time is included in the period, the server apparatus provides the client with the judgment result.

Supplementary Note 3

The information processing system according to Supplementary note 1 or 2, wherein
the server apparatus judges whether or not the date and time is included in a period starting from a time to start generation of the target information to when a time allowed to be taken before generation of the target information has passed, and judges whether or not the first position satisfies a criteria of including a second position indicating a location of the target of interest, and as a result of the judgment, when having judged that the date and time is included in the period and that the first position satisfies the criteria, the server apparatus judges that the target information is true.

Supplementary Note 4

The information processing system according to Supplementary note 3, wherein
the server apparatus judges whether or not the first position matches the second position, or the first position is included in a predetermined range that includes the second position, and the server apparatus judges that the criteria is satisfied when having judged that the first position matches the second position or is included in the predetermined range.

Supplementary Note 5

The information processing system according to Supplementary note 3 or 4, wherein
the server apparatus judges that the criteria is satisfied when having judged that a distance between the first position and the second position is within a predetermined first reference.

Supplementary Note 6

The information processing system according to Supplementary note 4 or 5, wherein
when including information indicating that the first position and the second position are further oriented to a direction in which the target of interest is oriented, the server apparatus judges that the criteria is satisfied when having judged that the first position and the second position are both oriented in a same direction.

Supplementary Note 7

The information processing system according to any one of Supplementary notes 4 to 6, wherein
the target information is image information at least including the target of interest, and
when including information indicating that the first position and the second position are further in an imaging direction in which the target of interest is image-captured, the server apparatus judges that the criteria is satisfied when having judged that the first position and the second position indicate a same imaging direction.

Supplementary Note 8

The information processing system according to any one of Supplementary notes 3 to 7, wherein
the first position and the second position include a position in a certain place at which the target information should be generated.

Supplementary Note 9

The information processing system according to Supplementary note 3, wherein when the second position indicates a certain area forming a plane, the server apparatus judges that the criteria is satisfied when a distance between the first position and an end of the plane abutting against the first position is within a predetermined second reference.

Supplementary Note 10

The information processing system according to Supplementary note 3, wherein
the server apparatus further judges whether or not first identification information that can identify the target of interest and is acquired from the target of interest, matches second identification information defined in advance with respect to the target of interest, and the server apparatus judges that the target information is true when having judged that the first identification information matches the second identification information.

Supplementary Note 11

The information processing system according to Supplementary note 3, wherein
the server apparatus further judges whether or not first identification information that can identify a handling target having handled a phenomenon detected in relation to the target of interest and is obtained from the handling target matches second identification information defined in advance for the target of interest, and the server apparatus judges that the target information is true when having judged that the first identification information matches the second identification information.

Supplementary Note 12

The information processing system according to Supplementary note 10 or 11, wherein
when information indicating the date and time, information indicating the first position, and the first identification information are information acquired by communication means that is either wireless communication or contact communication.

Supplementary Note 13

The information processing system according to any one of Supplementary notes 1 to 12, wherein
when the server apparatus has judged that the target information is non-true, a user interface provided by the providing means at least include:
information indicating a judgment result by the server apparatus;
information instructing to generate the new target information;
information instructing to submit the new target information, and information indicating the date and time and the first position at which the new target information is generated;
means that operates, based on a user operation, generating means that can generate the new target information; and
means that operates, based on a user operation, submitting means that can submit information including the new target information and the information indicating the date and time and the first position.

Supplementary Note 14

The information processing system according to any one of Supplementary notes 1 to 10, 12 and 13, wherein
the target information includes at least one of: image information and moving image information including the target of interest and having been captured at the date and time and at the first position; sound information recorded at the date and time and at the first position; and log information recorded in the target of interest and having been acquired at the date and time and at the first position.

Supplementary Note 15

The information processing system according to Supplementary note 14, wherein
the target information is information generated in one of cases of: handling a phenomenon detected in relation to the target of interest; not handling the phenomenon; and performing an operation defined in relation to the target of interest.

Supplementary Note 16

The information processing system according to Supplementary note 14 or 15, wherein
the target information is information generated at each predetermined cycle.

Supplementary Note 17

A server apparatus judges whether or not target information related to a target of interest is true, based at least on information representing a date and time and a first position at which the target information is generated and based on a judgment condition for judging whether the target information is true or not, and the server apparatus provides a judgment result to a client used by a user when the target information is judged to be non-true.

Supplementary Note 18

A client, in accordance with a judgment result performed by a server apparatus on whether or not target information related to a target of interest is true, controls presentation means to present presentation information to be presented to a user who uses the client, in a mode recognizable by the user, and the client presents, to the user by controlling the presentation means, the presentation information instructing at least submission of new target information when the server apparatus has judged that the target information is non-true.

Supplementary Note 19

An information processing method is performed by an information processing system including a server apparatus and a client communicably coupled to the server apparatus via a communication network, the information processing method comprising;
by the server apparatus, judging whether or not target information related to a target of interest is true, based at least on information representing a date and time and a first position at which the target information is generated and based on a judgment condition for judging whether the target information is true or not, and providing a judgment result to the client when the target information is judged to be non-true, and by the client, controlling to present presentation information to a user who uses the client, in a mode recognizable by the user, in accordance with the judgment result in the server apparatus, and presenting the presentation information instructing at least submission of new target information to the user by controlling the presentation means, in accordance with the judgment result indicating non-true.

Supplementary Note 20

A recording medium storing therein a computer program that causes a computer to execute:

a function of judging whether or not target information related to a target of interest is true, based at least on information representing a date and time and a first position at which the target information is generated and based on a judgment condition for judging whether the target information is true or not, and of providing a result of the judgment to a client used by a user when the target information is judged to be non-true.

Supplementary Note 21

A recording medium storing therein a computer program of a client that causes a computer to execute:

a function of controlling presentation means to present presentation information to be presented to a user who uses a client, in a mode recognizable by the user, in accordance with a judgment result performed by a server apparatus on whether or not target information related to a target of interest is true, and presents, to the user by controlling the presentation means, the presentation information instructing at least submission of new target information when the server apparatus has judged that the target information is non-true.

INDUSTRIAL APPLICABILITY

The present invention can be applied widely to systems other than plant systems, in which certain statuses are defined and which can acquire various types of data related to status. For example, the present invention can be applied to monitoring of a state of a system in a power plant, an information and communication technology (ICT) system, carrier communication equipment, and a moving body such as an automobile, a railroad, an airplane, and a ship.

So far, the present invention has been described by way of the exemplary example embodiments in the above. However, the present invention is not limited to the above-described example embodiments. That is, the present invention can be applied in various modes which those skilled in the art can understand within the scope of the present invention.

The present application claims the priority based on Japanese Patent Application No. 2016-045360 filed on Mar. 9, 2016, the entirety of which is incorporated herein.

REFERENCE SIGNS LIST 1, 10 information processing system
2, 11 server apparatus
3, 12 client
4, 26 presentation unit
13 judgment unit
14 presentation control unit
20 plant monitoring system
21 plant monitoring apparatus
22 client
23 analyzing unit
24 information control unit
25 storage
27, 30 transmission unit
28, 31 receiving unit
29 information generation unit
101, 102, 103 generated information
111 alarm management information
112 staff management information
113 handling information
300 information processing apparatus
301 CPU
302 ROM
303 RAM
304 hard disk
305 communication interface
306 bus
307 input/output interface

The invention claimed is:

1. An information processing system including a server apparatus and a client communicably coupled to the server apparatus via a communication network, wherein the server apparatus receives a target evidence by the client, judges whether or not the target evidence is true, based on a date and time and a first position at which the target evidence is captured and based on a judgment condition for judging whether the target evidence is true or not, wherein the target evidence indicates that a field staff handled an anomaly in equipment, and the server apparatus provides a judgment result to the client when the target evidence is judged to be non-true, and the client transmits the target evidence captured by a camera of the client to the server, displays the judgement result provided by the server apparatus, instructions of capturing new target evidence, and instructions of submitting the new target evidence and information representing the date, time and the first position at which the new target evidence is captured, and starts operation of the camera to capture the new target evidence as the new target evidence, wherein the server apparatus judges that the target evidence is true when a distance between the first position and a second position indicating a location of the equipment is within a predetermined first reference.

2. The information processing system according to claim 1, wherein the server apparatus provides the client with the judgment result when a current date and time is included in a period starting from a time to start generation of the target evidence to when a time allowed to be taken before generation of the target evidence has passed.

3. The information processing system according to claim 1, wherein the server apparatus judges that the target evidence is true when the date and time is included in a period starting from a time to start generation of the target evidence to when a time allowed to be taken before generation of the target evidence has passed.

4. The information processing system according to claim 3, wherein the server apparatus judges that the target evidence is true when the first position matches the second position, or the first position is included in a predetermined range that includes the second position.

5. The information processing system according to claim 4, wherein
the first position and the second position include a direction in which the equipment is oriented, and
the server apparatus judges that the target evidence is true when the first position and the second position include a same direction.

6. The information processing system according to claim 4, wherein
the target evidence is an image including the equipment,
the first position and the second position include a direction in which the image is captured, and
the server apparatus judges that the target evidence is true when the first position and the second position include a same direction.

7. The information processing system according to claim 3, wherein
the first position and the second position include a position in a certain place at which the target evidence is to be generated.

8. The information processing system according to claim 3, wherein
the second position indicates a certain area forming a plane, and
the server apparatus judges that the target evidence is true when a distance between the first position and an end of the plane abutting against the first position is within a predetermined second reference.

9. The information processing system according to claim 3, wherein
the server apparatus judges that the target evidence is true when first identification information to identify the equipment and is acquired from the equipment, matches second identification information defined in advance with respect to the equipment.

10. The information processing system according to claim 3, wherein
the server apparatus judges that the target evidence is true when first identification information to identify a handling target having handled a phenomenon detected in relation to the equipment and is obtained from the handling target matches second identification information defined in advance for the equipment.

11. The information processing system according to claim 9, wherein
the date and time, the first position, and the first identification information are acquired by communication means that is either wireless communication or contact communication.

12. The information processing system according to claim 1, wherein
when the server apparatus has judged that the target evidence is non-true,
the client
displays the judgment result provided by the server apparatus, the instructions of capturing the new target evidence, and the instructions of submitting the new target evidence and the information representing the date and time and the first position at which the new target evidence is captured, and
receives an operation to capture the new target evidence, and an operation to submit the new target evidence and the information representing the date and time and the first position.

13. The information processing system according to claim 1, wherein
the target evidence includes at least one of: an image and a movie including the equipment and having been captured at the date and time and at the first position; a sound recorded at the date and time and at the first position; and log information recorded in the equipment and having been acquired at the date and time and at the first position.

14. The information processing system according to claim 13, wherein
the target evidence is generated in one of cases of: handling a phenomenon detected in relation to the equipment; not handling the phenomenon; and performing an operation defined in relation to the equipment.

15. The information processing system according to claim 13, wherein
the target evidence is generated at each predetermined cycle.

16. A client that displays instructions of submitting new target evidence in accordance with a judgment result indicating target evidence is non-true in a server apparatus, wherein
the server apparatus receives a target evidence by the client, judges whether or not the target evidence is true, based on a date and time and a first position at which the target evidence is captured and based on a judgment condition for judging whether the target evidence is true or not, wherein the target evidence indicates that a field staff handled an anomaly in equipment, and the server apparatus provides a judgment result to the client when the target evidence is judged to be non-true, and
the client transmits the target evidence captured by a camera of the client to the server, displays the judgement result provided by the server apparatus, instructions of capturing new target evidence, and instructions of submitting the new target evidence and information representing the date, time and the first position at which the new target evidence is captured such that the client controls the operation of the camera to capture the new target evidence based on the judgment result provided by the server apparatus,
wherein the server apparatus judges that the target evidence is true when a distance between the first position and a second position indicating a location of the equipment is within a predetermined first reference.

17. An information processing method is performed by an information processing system including a server apparatus and a client communicably coupled to the server apparatus via a communication network, the information processing method comprising;
by the server apparatus, receiving a target evidence by the client, judging whether or not the target evidence is true, based on a date and time and a first position at which the target evidence is captured and based on a judgment condition for judging whether the target evidence is true or not, wherein the target evidence indicates that a field staff handled an anomaly in equipment, and providing a judgment result to the client when the target evidence is judged to be non-true, and by the client, transmitting the target evidence captured by a camera of the client to the server, displaying the judgement result provided by the server apparatus, instructions of capturing new target evidence, and instructions of submitting the new target evidence and information representing the date, time and the first position at which the new target evidence is captured, and starting operation of the camera to capture the new target evidence as the new target evidence, wherein the server apparatus judges that the target evidence is true when a distance between the first position and a second position indicating a location of the equipment is within a predetermined first reference.

\* \* \* \* \*